(12) United States Patent
Kralic et al.

(10) Patent No.: US 11,702,838 B2
(45) Date of Patent: Jul. 18, 2023

(54) PANEL

(71) Applicant: BLUESCOPE STEEL LIMITED, Melbourne (AU)

(72) Inventors: John Kralic, North Sydney (AU); Michael Celeban, North Sydney (AU); Rodney Gallaty, North Sydney (AU); Robert Klees, North Sydney (AU); Glen Hampton, North Sydney (AU)

(73) Assignee: BLUESCOPE STEEL LIMITED, Melbourne (AU)

( * ) Notice: Subject to any disclaimer, the term of this patent is extended or adjusted under 35 U.S.C. 154(b) by 0 days.

(21) Appl. No.: 16/766,593

(22) PCT Filed: Nov. 26, 2018

(86) PCT No.: PCT/AU2018/051259
§ 371 (c)(1),
(2) Date: May 22, 2020

(87) PCT Pub. No.: WO2019/100120
PCT Pub. Date: May 31, 2019

(65) Prior Publication Data
US 2021/0071410 A1    Mar. 11, 2021

(30) Foreign Application Priority Data
Nov. 24, 2017    (AU) ................ 2017904751

(51) Int. Cl.
*E04C 2/08*    (2006.01)
*E04B 1/24*    (2006.01)
(Continued)

(52) U.S. Cl.
CPC .............. *E04C 2/08* (2013.01); *B32B 7/04* (2013.01); *E04B 1/2403* (2013.01); *E04B 2/58* (2013.01);
(Continued)

(58) Field of Classification Search
CPC .. E04B 1/2403; E04B 2/58; E04B 2001/2418; E04B 2001/2481; E04C 2/08;
(Continued)

(56) References Cited

U.S. PATENT DOCUMENTS 3,466,831 A * 9/1969 Lenoir .................... E04C 2/292
                                                        52/521
3,535,844 A * 10/1970 Michael .................. E04F 13/12
                                                        52/592.1
(Continued)

FOREIGN PATENT DOCUMENTS

DE    202012101408 U1    5/2012
FR        2737236 A1    1/1997
(Continued)

OTHER PUBLICATIONS

Australian Patent Office, International Search Report dated Feb. 1, 2019 in connection with International Application No. PCT/AU2018/051259, 5 pages.
(Continued)

*Primary Examiner* — Jessie T Fonseca
(74) *Attorney, Agent, or Firm* — Nyemaster Goode, P.C.

(57) ABSTRACT

A wall/roof panel includes (a) a façade that has (i) an outer surface that defines a front surface of the panel and (ii) a rear surface and (b) a structural element connected to and supporting the façade.

33 Claims, 20 Drawing Sheets

(51) Int. Cl.
  *E04B 2/58* (2006.01)
  *E04C 2/32* (2006.01)
  *E04D 3/30* (2006.01)
  *E04D 3/35* (2006.01)
  *E04D 3/365* (2006.01)
  *B32B 7/04* (2019.01)
  *E04C 2/00* (2006.01)

(52) U.S. Cl.
  CPC ............... *E04C 2/322* (2013.01); *E04D 3/30* (2013.01); *E04D 3/35* (2013.01); *E04D 3/365* (2013.01); *E04B 2001/2418* (2013.01); *E04B 2001/2481* (2013.01); *E04C 2002/004* (2013.01)

(58) Field of Classification Search
  CPC ..... E04C 2/322; E04C 2002/004; E04D 3/30; E04D 3/35; E04D 3/365; E04D 3/36; E04D 13/0445; B32B 7/04
  See application file for complete search history.

(56) References Cited

U.S. PATENT DOCUMENTS

| | | | | |
|---|---|---|---|---|
| 3,555,756 | A * | 1/1971 | Curran et al. | B32B 38/0012 428/319.1 |
| 3,815,310 | A * | 6/1974 | Kessler | E04F 13/0864 52/531 |
| 3,996,712 | A * | 12/1976 | Howell | E04B 2/72 52/241 |
| 4,133,158 | A * | 1/1979 | Ting | B32B 3/28 52/478 |
| 4,411,121 | A * | 10/1983 | Blacklin | E04C 2/08 52/789.1 |
| 4,655,020 | A * | 4/1987 | Ginn, Jr. | E04D 3/38 52/521 |
| 4,718,214 | A | 1/1988 | Waggoner | |
| 5,146,727 | A * | 9/1992 | Hansson | E04F 13/12 52/531 |
| 5,239,798 | A | 8/1993 | Saito | |
| 5,448,872 | A * | 9/1995 | Thompson | E04C 2/08 52/309.9 |
| 5,632,126 | A * | 5/1997 | Agsten | E04B 2/8635 52/106 |
| 5,979,136 | A * | 11/1999 | Marschak | E04C 2/08 52/462 |
| 6,085,485 | A * | 7/2000 | Murdock | E04C 2/36 52/794.1 |
| 6,233,892 | B1 * | 5/2001 | Tylman | E04B 7/22 52/309.12 |
| 7,540,123 | B1 * | 6/2009 | Semmes | E04C 2/292 52/783.14 |
| 2002/0088199 | A1 * | 7/2002 | Linn | E04C 2/26 52/745.19 |
| 2003/0101682 | A1 | 6/2003 | Crye et al. | |
| 2009/0000246 | A1 * | 1/2009 | Chang | E04C 2/36 52/783.11 |
| 2009/0277108 | A1 * | 11/2009 | Hay, III | E06B 9/02 52/204.62 |
| 2012/0085062 | A1 | 4/2012 | Neumayr | |
| 2014/0311076 | A1 * | 10/2014 | Ishaque | E04F 13/0876 52/404.2 |
| 2017/0037621 | A1 * | 2/2017 | Grenier | E04C 2/322 |
| 2017/0306624 | A1 * | 10/2017 | Graham | B32B 3/20 |
| 2018/0038103 | A1 * | 2/2018 | Neumayr | E04C 2/3405 |
| 2018/0066432 | A1 * | 3/2018 | Izumi | E04D 1/18 |
| 2018/0080228 | A1 * | 3/2018 | Izumi | E04D 1/18 |

FOREIGN PATENT DOCUMENTS

| | | |
|---|---|---|
| JP | H04-166541 A | 6/1992 |
| WO | 1993012304 A1 | 6/1993 |
| WO | 2008127207 A2 | 10/2008 |
| WO | 2015131241 A1 | 9/2015 |

OTHER PUBLICATIONS

International Searching Authority, Written Opinion dated Feb. 10, 2019 in connection with International Application No. PCT/AU2018/051259, 5 pages.

Intellectual Property Office of Singapore, Search Report and Written Opinion dated Feb. 23, 2021 in connection with patent application No. 11202004823U, 11 pages.

* cited by examiner

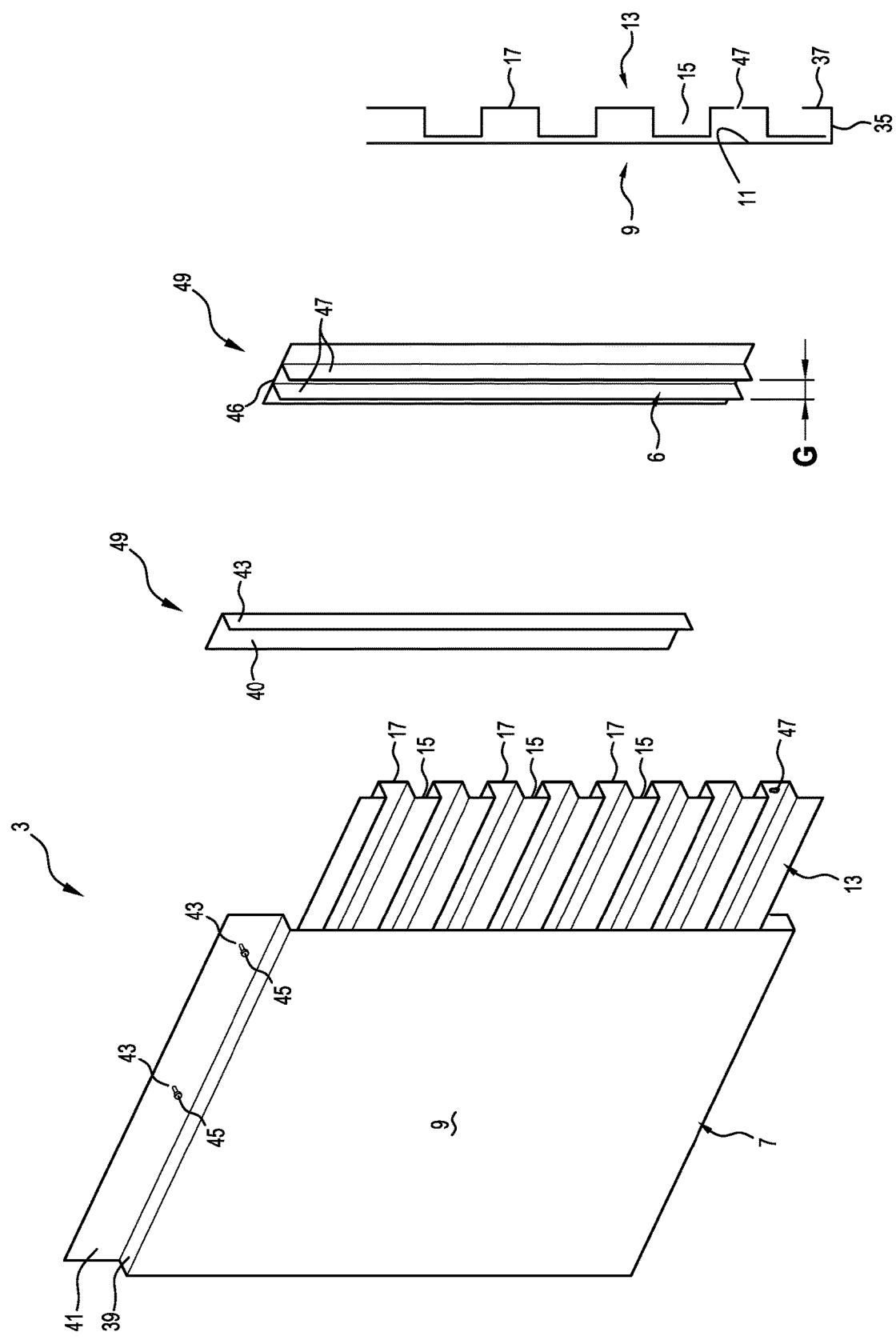

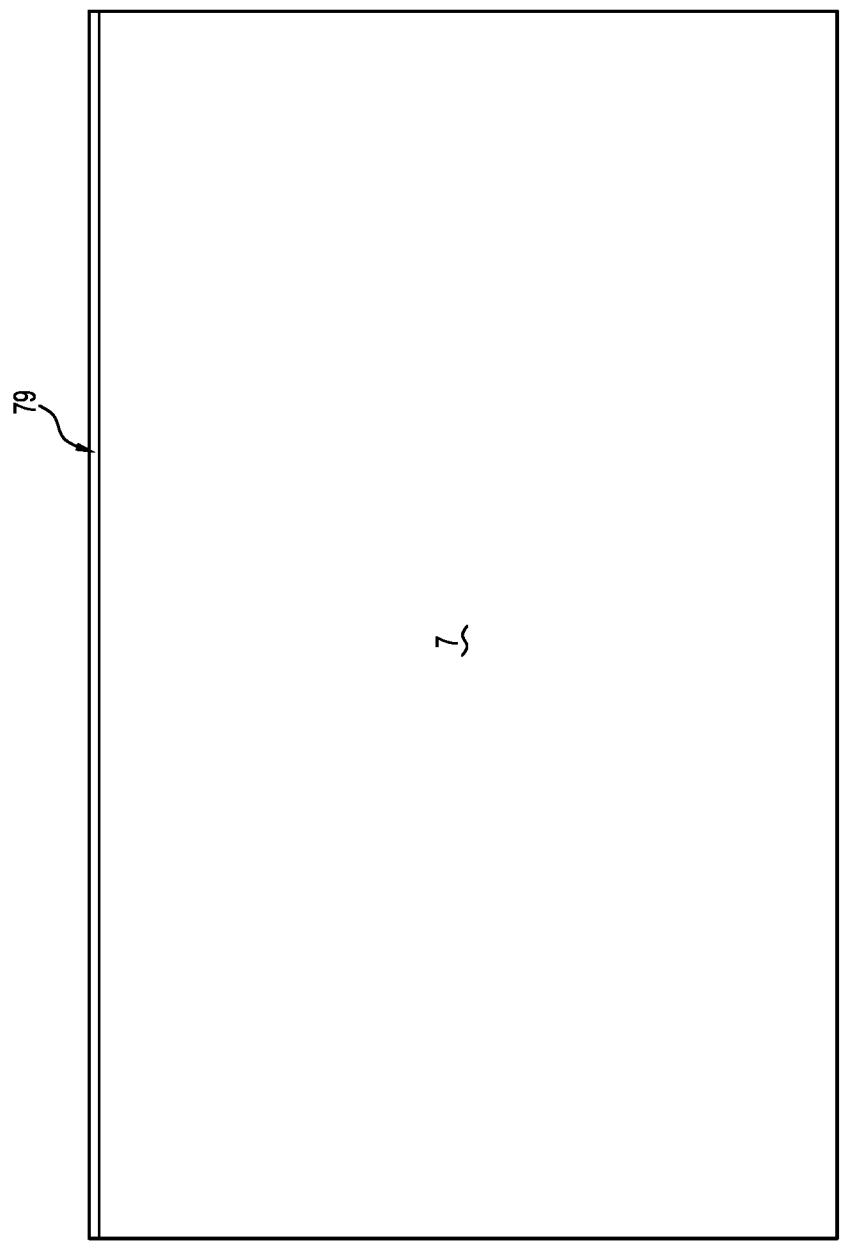
*Figure 16*
*Figure 15*

*Figure 19*
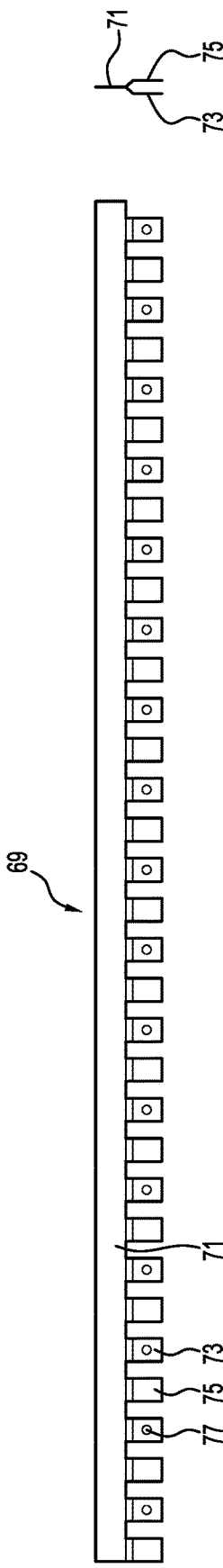
*Figure 20*
*Figure 21*

PANEL

CROSS-REFERENCE TO RELATED APPLICATIONS

This application is a National Stage Entry of International Patent Application No. PCT/AU2018/051259, filed on Nov. 26, 2018, entitled "PANEL", which claims priority to Australian Patent Application No. 2017904751, filed on Nov. 24, 2017, entitled "PANEL". The disclosures of all of the above applications are incorporated herein by reference in their entirety.

TECHNICAL FIELD

The present invention relates to a panel that is suitable for use as a wall panel.

The present invention relates to a panel that is suitable for use as a roof panel.

The present invention also relates to a wall panel system that includes a plurality of the wall panels.

The present invention also relates to a roof panel system that includes a plurality of the roof panels.

BACKGROUND ART

The present invention provides a wall panel that can be used as a basic unit in the construction of an exterior wall or an interior wall of a building.

The present invention also provides a roof panel that can be used as a basic unit in the construction of an exterior skin of a roof of a building.

The term "building" is understood herein to be any type of building such as a domestic house, shed, garage, apartment building or office building.

There is a wide range of different known options for wall panels and wall panel systems for use in the construction of exterior and interior walls of buildings.

In the case of exterior walls, the options include conventional options for constructing timber or steel frames and brick or timber exteriors on a building site.

The options also include wall cladding systems that do not form a major structural part of exterior walls that are manufactured in a factory and are transported to a building site and are connected to a structural part of exterior walls and provide a required exterior appearance.

The options also include pre-cast wall panels that form major structural components of exterior walls and are manufactured in a factory and transported to a building site and used in the construction of exterior walls. These pre-cast wall panels may be formed with exterior surfaces that provide an attractive exterior appearance for the wall. These pre-cast wall panels may also be formed to be used with an exterior cladding that provides a required exterior appearance.

Each of the exterior and interior wall panels and wall panel systems known to the applicant has advantages and disadvantages.

There is also a wide range of different known options for roof panels and roof panel systems for use in the construction of roofs of buildings.

The options include masonry tiles and profiled steel roof panels.

Each of the roof panels and roof panel systems known to the applicant has advantages and disadvantages.

The present invention provides an alternative wall panel and wall panel system to the wall panels and wall panel systems known to the applicant.

The present invention also provides an alternative roof panel and roof panel system to the roof panels and roof panel systems known to the applicant.

The above references to the background art do not constitute an admission that the art forms a part of the common general knowledge of a person of ordinary skill in the art.

SUMMARY OF THE DISCLOSURE

In general terms, the present invention provides a panel for a wall or a roof that is adapted to be mounted to a structural framework of the wall or the roof, the panel including at least two components that are connected together, with the components comprising (a) a façade that has (i) an outer surface that defines a front surface of the panel and (ii) a rear surface and (b) a structural element connected to and supporting the façade.

One purpose of the structural element is to make it possible to provide the panel with sufficient structural rigidity to resist warping, twisting, buckling and other forms of distortion of the panel that detract from the appearance of the front surface of the façade of the panel. In other words, one purpose of the structural element is to structurally support the façade so that the front surface presents a required appearance without any distortion of the front surface. For example, in the case of a flat front surface of the façade, the purpose of the structural element is to ensure that the panel presents the front surface of the façade as a flat surface and not with rippling or other distortions of the flat surface that detract from the intended appearance.

Another purpose of the structural element is to facilitate mounting the panel to the structural framework. More specifically, this other purpose is to make it possible to confine the functionality to mount the panel to the structural framework to the structural element and not to the façade of the panel. As a consequence, the exterior appearance of the panel need not be compromised by fasteners extending through the façade that are visible to persons looking at the panel.

The façade may be made from any suitable material and be in any suitable form.

The façade may be made from a sheet material.

The façade may be made from steel sheet. Other options are aluminium and other metal sheet materials.

The combination of the façade and the structural element makes it possible to form the façade from thin sheet, such as thin gauge steel sheet, such as 0.4-0.7 mm thickness steel sheet. This thickness range is by way of example only.

The structural element may be made from any suitable material and be any suitable form.

By way of example, the structural element may be one or more than one elongate stiffener, such as a flat strip, adhered or otherwise connected to the rear surface of the façade.

In an embodiment, the structural element includes a plurality of elongate stiffeners, such as flat strips, spaced apart and adhered or otherwise connected to the rear surface of the façade.

By way of further example, the structural element may be a profiled sheet having parallel ribs and parallel troughs positioned with the ribs or the troughs contacting and connected to the rear surface of the façade.

The profiled sheet may be made from any suitable material.

Typically, the profiled sheet is made from a metal (which term includes metal alloy), such as steel or aluminium.

Forming the structural element as a profiled sheet with ribs and troughs makes it possible to make the structural element from thin gauge steel sheet, such as 0.4-0.7 mm thickness sheet. This thickness range is by way of example only.

The façade and the structural element may be connected together with an adhesive.

The façade and the structural element may be mechanically connected together. This is an important functional feature, for example in the case of a fire which may cause adhesive to fail. The mechanical connection will keep the façade and the structural element together and maintain the panel.

The mechanical connection may be any suitable connection.

For example, the mechanical connection may be via fasteners.

By way of further example, the mechanical connection may be via a mechanical interlock between the façade and the structural element.

The mechanical interlock may be a friction fit of the structural element and the façade.

The mechanical interlock may be the result of folding a section of the structural element over a section of the façade.

The panel may be formed so that in use adjacent panels are in an overlapping relationship with the front surfaces of the façades of adjacent panels forming a continuous front surface on the wall or the roof.

The overlapping relationship may be side-by-side and/or end-to-end relationship with the front surfaces of the façades of the adjacent panels forming a continuous front surface on the wall or the roof.

The overlapping relationship may involve a section of the structural element of one panel, covering, i.e. overlapping, a section of the structural element of another panel.

The overlapping relationship may involve a section of one panel covering, i.e. overlapping, a section of another panel.

By way of example, the panel may be formed so that adjacent panels in use are in the overlapping relationship with one panel of a pair of adjacent panels extending partially over and covering the other panel of the pair of panels and forming a continuous front surface on the wall or the roof, for example with a saw-tooth profile when viewed from a side of the panels.

The overlapping relationship may be between:
(a) lower and upper panels; and/or
(b) side-by-side panels.

The panel may be formed so that adjacent panels in use are in abutting relationship with the front surfaces of the façades of the adjacent panels forming a continuous front surface on the wall or the roof. The panel may be formed so that adjacent panels in use are in spaced-apart relationship with a defined gap between the adjacent panels on the wall or the roof.

The panel may include a weather seal to prevent water flowing under the façades at the join between adjacent panels.

The panel may include an alignment/fastening system for facilitating alignment of the panel in relation to other panels and the structural framework and fastening the panel to the structural framework.

In one embodiment, the alignment/fastening system may be a concealed system in that the system is not visible when a person views the panel positioned on a wall or a roof. The alignment/fastening system may include:

(a) an elongate retainer member, such as an elongate plate, that is connected to the structural element on a bottom surface of the structural element, with the retainer member and the structural element defining a plurality of spaced-apart slots; and
(b) an elongate retainer element (which may also be described as a "ladder" clip) that is connected to the front surface of the façade on a front surface of the roof panel and includes an elongate strap and a series of tabs that extend from one side of the strap, with a first series of tabs including openings to facilitate fastening the tabs to a structural framework and a second series of tabs to extend into the spaced-apart slots of the retainer plate 61 of a panel in a successive row that, in use in the construction of a wall or a roof, is formed and thereby locate the two panels together.

It is noted that the elongate retainer element may be a separate element and used as a separate element.

In another, although not the only other embodiment, the alignment/fastening system may include openings, such as openings that each have a positioning component and a locking component, such as keyhole openings, in the structural element that in use of the panel locate in a correct alignment the panel on mounting elements such as fasteners that are connected to the structural framework.

The alignment/fastening system may include openings, such as openings that each have a positioning component and a locking component, such as keyhole openings, in the structural element that in use of the panel locate the panel on mounting elements such as fasteners that mount another panel to the structural framework.

The structural element may be completely behind the façade.

The structural element may be partially behind the façade and extend partially laterally in relation to the façade.

By way of example, when the structural element is a profiled sheet, the profiled sheet may extend partially laterally from at least one side of the façade as an exposed section that is visible when the panel is viewed in a direction looking towards the façade.

By way of example, when the structural element is a profiled sheet, the profiled sheet may extend partially from two sides of the façade as two exposed sections that are visible when the panel is viewed in a direction looking towards the façade.

With the arrangements described in the two preceding paragraphs, the exposed section or sections may include openings, such as such as openings that each have a positioning component and a locking component, such as keyhole openings, that in use 2 o of the panel locate the panel in a correct alignment on mounting elements such as fasteners that are connected to the structural framework. The exposed section or sections with the openings and the fasteners facilitate securing successive panels to the structural framework of the wall or the roof.

When the structural element is a profiled sheet, the ribs or the troughs of the structural element and the rear surface of the façade may be adhered together. The invention is not limited to the use of an adhesive to connect together the ribs of the structural element and the rear surface of the façade.

The profiled steel sheet may be described as a corrugated sheet in one embodiment.

The profiled steel sheet may have a square or a trapezoidal profile with the parallel ribs and parallel troughs being flat surfaces interconnected by straight surfaces that are perpendicular to the ribs and the troughs in the case of the square profile or angled surfaces in the case of the trapezoidal profile. Forming the ribs and the troughs as flat surfaces maximises contact with the rear surface of the façade when the ribs are in contact with the façade and when the troughs are in contact with the façade. The invention is not limited to a square or a trapezoidal profile.

The front surface of the façade may be a flat surface.

The invention is not limited to façades having flat surfaces. The façade may be any surface profile that presents a required outwardly-facing appearance.

The façade may be quadrilateral with a first pair of parallel sides and a second pair of parallel sides.

The sides of the first pair of parallel sides of the façade may be any suitable form.

By way of example, the sides of the first pair of parallel sides of the façade may formed to contribute to locating the façade and the structural element together.

For example, the sides of the first pair of parallel sides of the façade may include complementary formations, such as complementary male and female formations, that allow the above-described overlapping relationship with an adjacent panel.

By way of further example, the sides of the first pair of parallel sides of the façade may be formed to contribute to locating the panel in relation to the structural framework.

By way of particular example, one side of the first pair of parallel sides of the façade may include an extension of the front surface of the façade that can be fastened to the structural framework and then covered by an adjacent panel when, in use, the adjacent panel is positioned in the overlapping relationship.

The one side of the first pair of parallel sides may include a flange extending rearwardly from the front surface of the façade and a lip extending outwardly from the flange and the front surface of the façade, parallel to the front face of the façade. Basically, the lip is the extension of the front surface of the façade. One purpose of the flange may be to contribute to locating the façade and the structural element together. One purpose of the lip may be to contribute to locating the panel in relation to the structural framework. Another purpose of the lip may be to provide the above-described overlapping relationship with an adjacent panel.

The lip may include a plurality of openings to receive mounting elements such as fasteners to mount the panel to the structural framework.

The other side of the first pair of parallel sides may include a flange extending rearwardly from the front surface of the façade and an upturned lip. This arrangement of the (a) front surface of the façade, (b) the flange and (c) the lip defines a channel.

The channel may receive the structural element and thereby contribute to locating the façade and the structural element together.

The structural element may extend between the flanges of the first pair of parallel sides.

The flanges of the two sides of the first pair of parallel sides may define upper and lower side edges of the panel when positioned on the wall or the roof.

The flanges of the two sides of the first pair of parallel sides may define opposite side edges of the panel when positioned on the wall or the roof.

The sides of the second pair of parallel sides of the façade may be any suitable form.

By way of example, each side of the second pair of parallel sides may include a rearwardly extending flange. The flanges may define opposite side edges of the wall panel, with the structural element extending between the side edges. With this arrangement, one purpose of the flanges may be to contribute to locating the façade and the structural element together.

By way of further example, each side of the second pair of parallel sides may be open and the panel may include a separate elongate edge element that can be located to close each side of the second pair of parallel sides.

The edge element may be a L-shaped element that can be located so that one web of the element contacts a rear surface of the panel and the other web of the element closes a side of the second pair of parallel sides.

Another option for the edge element is that the element be adapted to close each side of the second pair of parallel sides of two adjacent panels. The edge element may be formed to define an elongate gap between adjacent panels. The edge element may include a backing plate and two spaced-apart parallel webs extending from the plate, with a section of the backing plate and one of the webs defining the above-described L-shaped element, and with another section of the backing plate and the other of the webs defining the above-described L-shaped element.

The structural element may extend between the sides of the second pair of parallel sides.

The sides of the second pair of parallel sides may define upper and lower side edges of the panel when positioned on the wall or the roof.

The sides of the second pair of parallel sides may define opposite side edges of the panel when positioned on the wall or the roof.

The space defined by each trough and the façade may be used to locate building services.

The panel may be any suitable size. By way of example, the panel may be 1-2 m wide and 3-4 m long.

The present invention also includes a panel system for a wall or a roof that comprises a structural framework and a plurality of the above-described panels connected to the framework.

The ribs and the troughs of the structural elements of each panel may be horizontal. Horizontal ribs and troughs may be more suitable for wall panel applications.

The ribs and the troughs of the structural elements of each panel may be vertical. Vertical ribs and troughs may be more suitable for roof panel applications.

The invention is not confined to these orientations of the ribs and the troughs.

In the case of a wall, the structural framework may include a plurality of parallel upwardly extending posts and parallel horizontally-extending rails connected to the posts. The posts and rails may be made from steel sheet or any other suitable material.

The wall panel assembly may be a major component of the structure of a wall.

Alternatively, the wall panel assembly may be a minor component only, such as a cladding, of a wall.

The wall may be an exterior wall.

The wall may be an interior wall.

In the case of a roof, the structural framework may include a plurality of parallel rafters extending between a ridge board and a gutter and a plurality of parallel horizontally-extending battens connected to the rafters. The rafters and battens may be formed from steel sheet or any other suitable material.

The present invention also includes a wall or a roof constructed from a plurality of the above-described panels connected to a structural framework.

BRIEF DESCRIPTION OF THE DRAWINGS

The invention is described further by way of example only with reference to the accompanying drawings of which:

FIG. 1 is a perspective exploded view of one embodiment of a wall panel in accordance with the invention;

FIG. 2 is an enlarged end view of a lower part of the wall panel shown in FIG. 1;

FIG. 3 is a perspective view of an embodiment of a L-shape elongate edge element for use with the wall panel shown in FIG. 1;

FIG. 4 is a perspective view of another embodiment of an elongate edge element for use with the wall panel shown in FIG. 1;

FIG. 15 is a front view of the façade of the roof panel shown in FIG. 13;

FIG. 16 is a side view of the façade of the roof panel shown in FIG. 13;

FIG. 19 is a top view of a retainer plate of the roof panel shown in FIG. 13; and FIG. 20 is a top view of a retainer element of the roof panel shown in FIG. 13;

FIG. 21 is a side view of the retainer element shown in FIG. 20;

DESCRIPTION OF EMBODIMENTS

FIGS. 1-9 show an embodiment of a wall panel 3 of the invention and an embodiment of a wall panel system of the invention that includes a plurality of the wall panels 3, with the wall panels 3 forming an exterior skin of the wall.

Figure 10:
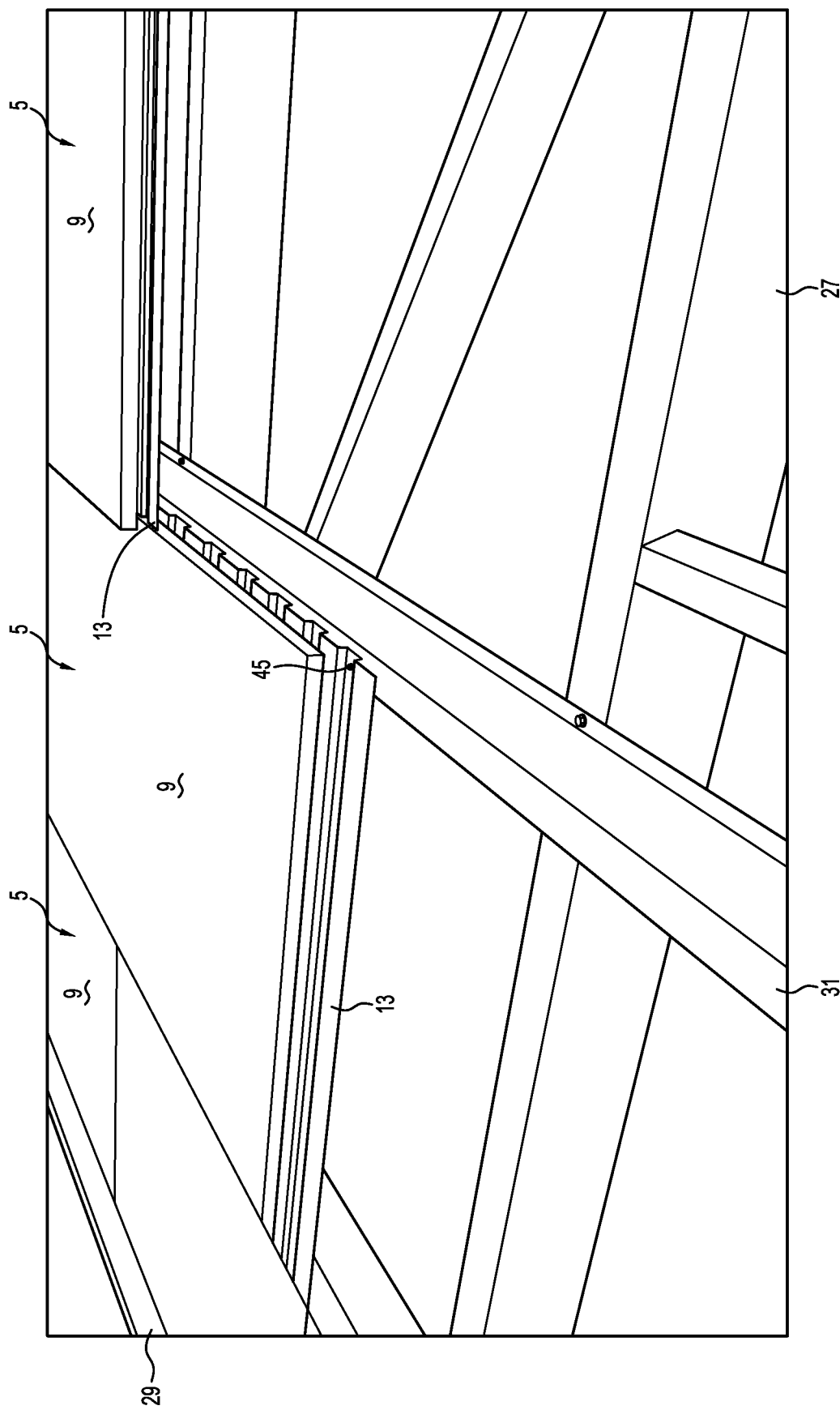
FIG. 10 is a perspective view of one embodiment of a roof in accordance with the invention formed from a plurality of one embodiment of a roof panel in accordance with the invention.
Figure 11:
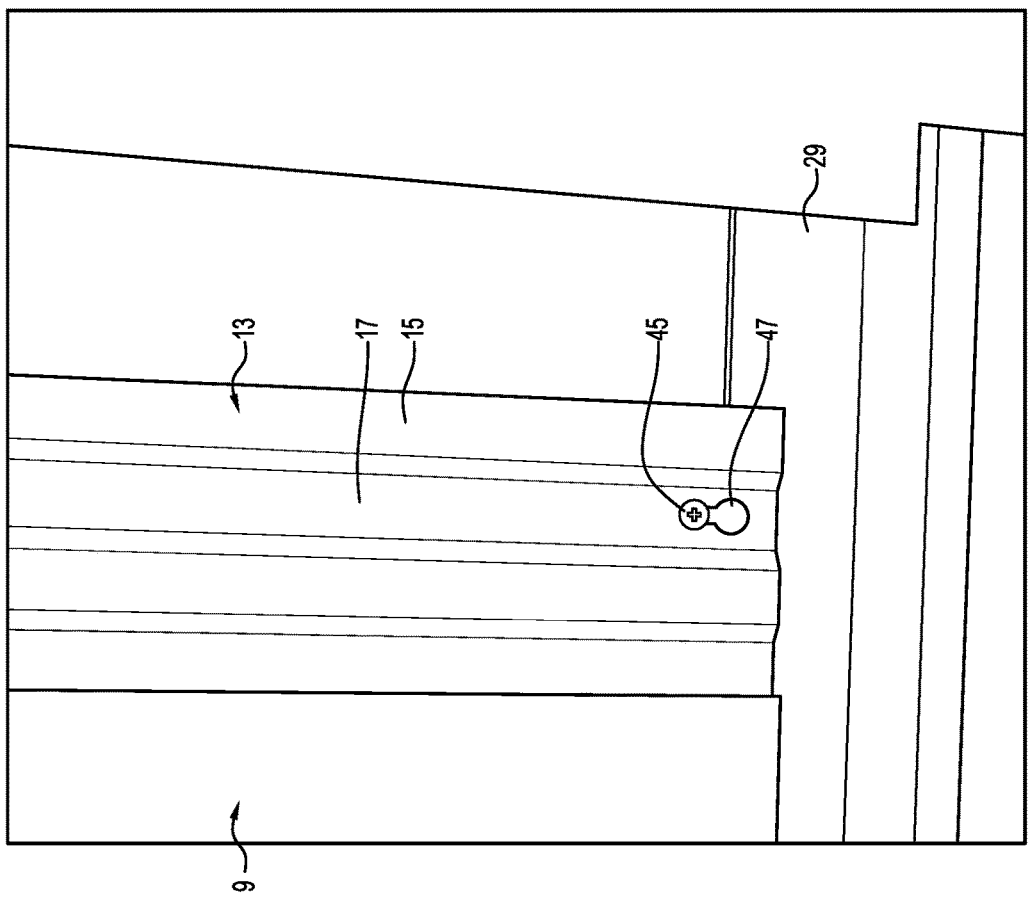
FIG. 11 is a perspective view of a gutter end of the embodiment of the roof shown in FIG. 10.
Figure 12:
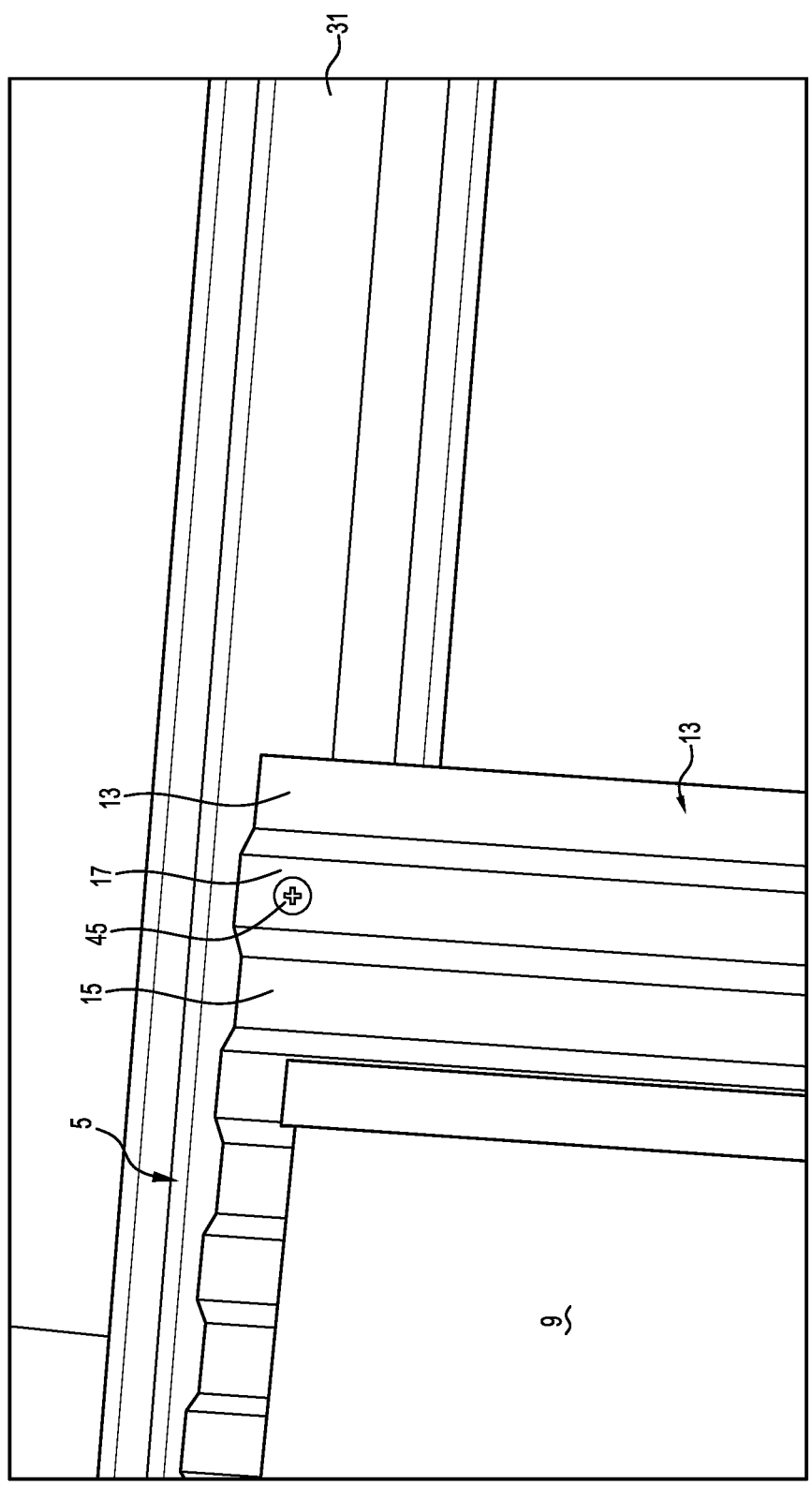
FIG. 12 is a perspective view of embodiment of the roof shown in FIG. 10 that shows how a panel is fastened to a roof support batten.

FIGS. 10-12 show an embodiment of a roof panel 5 of the invention and an embodiment of a roof panel system of the invention that includes a plurality of the roof panels 5, with the roof panels 5 forming an exterior skin of the roof.

FIGS. 13-22 show another embodiment of a roof panel 5 in accordance with the invention.

FIGS. 23-27 show another embodiment of a wall panel 3 in accordance with the invention.

Figure 28:
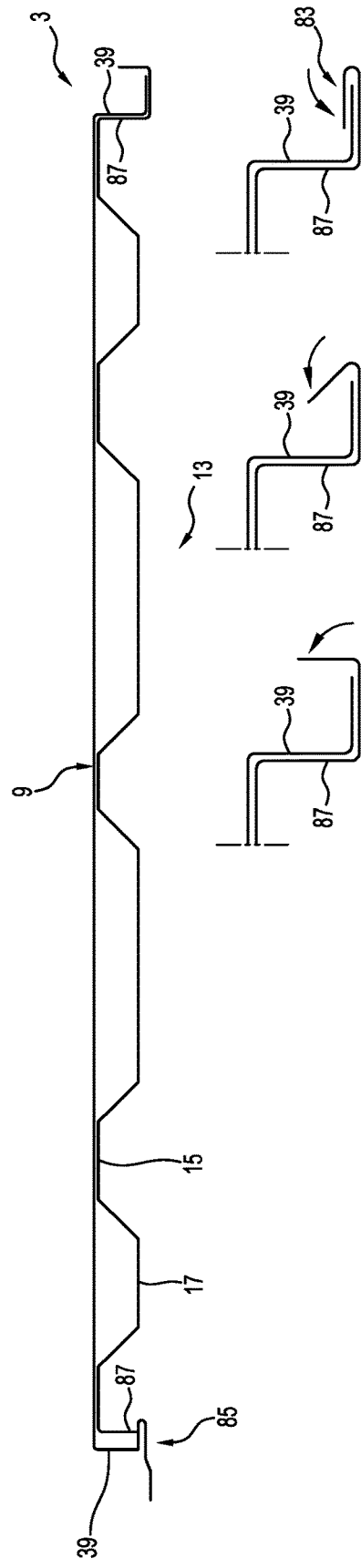
FIG. 28 is a cross-section similar to that shown in FIG. 27 of another embodiment of the wall panel of FIG. 23.

FIG. 28 shows another embodiment of a wall panel 3 in accordance with the invention.

Figure 29:
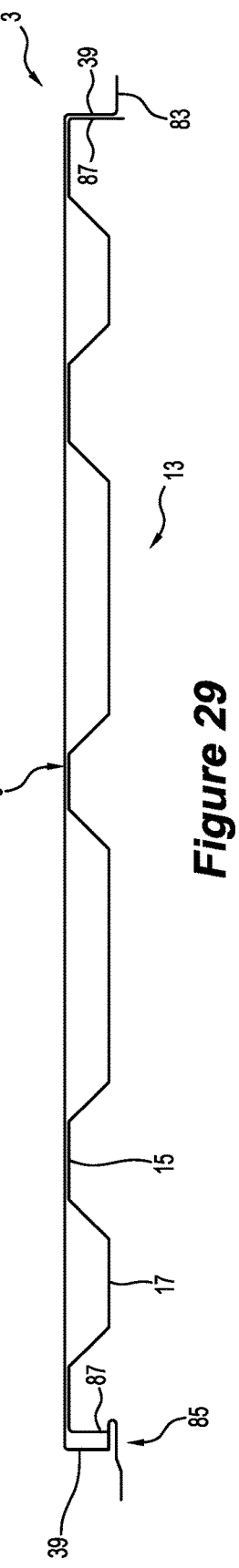
FIG. 29 is a cross-section similar to that shown in FIG. 27 of another embodiment of the wall panel of FIG. 23.

FIG. 29 shows another embodiment of a wall panel 3 in accordance with the invention.

The embodiments of the wall panel 3 and the roof panel 5 shown in the Figures may be any suitable shape and size. By way of example only, the panels 3, 5 may be 1-2 m wide and 3-4 m long. It is emphasised that these are examples of dimensions.

The embodiments of the wall panel 3 and the roof panel 5 are adapted to be mounted to a structural framework of a wall and a roof, respectively.

With reference to FIGS. 5-9, the structural framework of the wall includes a plurality of parallel spaced-apart upright posts 21 and horizontal rails 23 that are fastened together and to an underlying wall structure by suitable fasteners and an upwardly opening elongate channel member 31 (see FIG. 8) that forms a lower support for the wall panels 3 in a lowermost row of panels 3 and is fastened to the posts 21. The posts 21 and the rails 23 may be formed from timber, steel sheet or any other suitable material. The invention is not limited to this particular arrangement of posts and rails.

In the embodiments of the wall panel system shown in the Figures, the wall panel 3 is used as a minor component only, in this instance as an exterior cladding, of the wall and relies on a major underlying wall structure for support. The major underlying wall structure includes the plurality of parallel spaced-apart upright posts 21 and horizontal rails 23.

It is noted that the wall panel assembly may be a major component of the structure of a wall.

With reference to FIGS. 10-12, the structural framework of the roof includes a plurality of parallel spaced-apart rafters 27 extending between a ridge board (not shown) and a gutter 29 and a plurality of parallel horizontally-extending battens 31 connected to the rafters 27 by suitable fasteners. The rafters 27 and the battens 31 may be formed from timber, steel sheet or any other suitable material. The invention is not limited to this particular roof structural framework.

As is the case with the embodiments of the wall panel system, in the embodiments of the roof panel system shown in the Figures, the roof panel 5 is used as a minor component only, in this instance as an exterior cladding, of the roof and relies on a major underlying roof structure for support.

The embodiments of the wall panel 3 and the roof panel 5 shown in the Figures are not identical but have the same basic components, namely:

(a) a façade 7 that forms the exterior surface of the panels 3, 5 and has (i) an outer surface that defines a front surface 9 of the panels; and (ii) a rear surface 11; and (b) a structural element 13 connected to and supporting the façade 7.

In the embodiments shown in the Figures, the façade 7 and the structural element 13 of the wall panel 3 and the roof panel 5 are connected together with a suitable adhesive.

The present invention is not limited to the use of adhesives.

By way of example, the façade 7 and the structural element 13 of the embodiments of the wall panel 3 and the roof panel 5 may be mechanically connected together.

Figure 27:
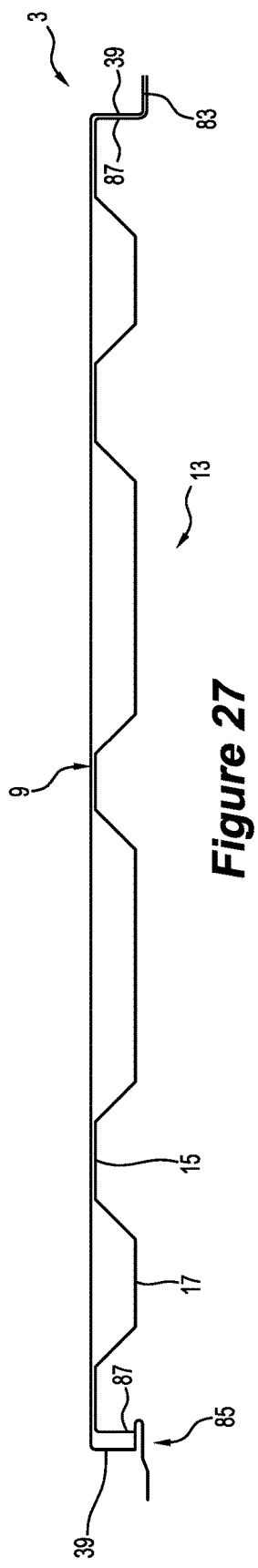
FIG. 27 is a cross-section along the line 27-27 in FIG. 23.

In this regard, the embodiments of the wall panel 3 shown in FIGS. 22-29 also includes a mechanical interlock, namely a friction fit, between the façade 7 and the structural element 13 at upper and lower ends (the left side and the right side of the embodiments as viewed in FIGS. 27-29).

The embodiment of the wall panel 3 shown in FIG. 28 also includes a further mechanical interlock in the form of a section of the structural element 13 that is folded over a section of the façade 7 and the structural element 13 at a lower end of the wall panel 5 (the right side of the embodiment as viewed in FIG. 28).

The mechanical interlocks are an important feature in situations where there is a fire risk, as described further below.

As viewed in the Figures, the façade 7 of the embodiments of the wall panel 3 and the roof panel 5 is formed from steel sheet, typically thin gauge sheet, and is quadrilateral with a pair of opposed parallel sides and parallel top and bottom as viewed in the Figures and presents a flat front surface 9 in both embodiments shown in the Figures.

The façade 7 may be any surface profile that presents a required outwardly-facing appearance.

The structural element 13 of the embodiments of the wall panel 3 and the roof panel 5 is a profiled steel sheet having parallel elongate ribs 15 and parallel elongate troughs 17 positioned with the ribs 15 contacting and adhered to the rear surface 19 of the façade 7. The rear surface of the façade 7 is shown only in FIG. 2.

In the embodiment of the wall panel 2 shown in FIGS. 1-9, the ribs 15 and the troughs 17 have a square form with the parallel ribs and parallel troughs being flat surfaces interconnected by straight surfaces that are perpendicular to or slightly inclined with respect to the ribs 15 and the troughs 17. Forming the ribs 15 and the troughs 17 as flat surfaces maximises contact with the rear surface of the façade 7 when the ribs 15 are in contact with the façade 7 and also has benefits in terms of maximising contact of the troughs 17 with support structures.

The invention is not limited to a square form profile.

By way of example, the ribs 15 and the troughs 17 may have a trapezoidal profile. This profile is shown in the embodiments of the wall panel 3 and the roof panel 5 in FIGS. 10-29.

By forming the structural element 13 as a profiled sheet with ribs 15 and troughs 17, it is possible to form the structural element 13 from thin gauge steel sheet, such as 0.4-0.7 mm thickness sheet. This thickness range is by way of example only.

The wall panel 3 is formed so that the structural element 13 is covered by the façade 7 when viewed looking at the front surface 9 of the façade 7.

As is evident from the exploded perspective view of FIG. 1, a lower section of the structural element 13 of the embodiments of the wall panel 3 of FIGS. 1-9 includes a plurality of spaced-apart openings 47 in a trough 17. The openings 47 facilitate mounting a lower section of another wall panel 3 in an overlapping relationship with the panel 3.

The embodiments of the wall panel 3 shown in FIGS. 23-29 have a different structure for facilitating mounting a lower section of another wall panel 3 in an overlapping relationship with the wall panel 3. This is described further below.

As is evident from FIGS. 10-12, the embodiment of the roof panel 5 shown in these Figures is formed with sections of the structural element 13 that extend laterally relative to the façade 7 along one side and across the top of the roof panel 5, whereby these sections are exposed sections that are visible when the panel 5 is viewed in a direction looking towards the façade 7. The exposed sections include a plurality of spaced-apart openings 47 (see FIG. 11) in a trough 17. The openings 47 facilitate mounting a lower section of another roof panel 5 in an overlapping relationship with the panel 5. The embodiment of the roof panel 5 shown in FIGS. 13-22 is a different arrangement and is described in a later section of the specification.

The sides of the embodiments of the wall panel 3 and the roof panel 5 shown in FIGS. 1-22 are open and the panels 3, 5 include separate elongate edge elements 49, i.e. mouldings, that can be located to close each side. On the other hand, the sides 81 of the embodiments of the wall panel 3 shown in FIGS. 23-29 are closed, as described further below.

Two embodiments of the edge elements 49 are shown in FIGS. 3 and 4.

The edge element 49 shown in FIG. 3 is a L-shaped element that can be located so that one web 40 of the element contacts a rear surface of the wall panel 3 and can be adhered to the wall panel 3 and the other web 43 of the edge element 49 closes a side of the wall panel 3.

The edge element 49 shown in FIG. 4 is adapted to close the sides of two adjacent wall panels 3. The edge element 49 is formed to define an elongate gap G between adjacent panels 3. The edge element 49 includes a backing plate 46 and two spaced-apart parallel webs 47 extending from the plate, with a section of the backing plate and one of the webs defining the above-described L-shaped element, and with another section of the backing plate and the other of the webs defining the above-described L-shaped element.

The combination of the façade 7 and the structural element 13 of the embodiments of the wall panel 3 and the roof panel 5 makes it possible to form the façade 7 from thin sheet, such as thin gauge steel sheet, such as 0.4-0.7 mm thickness steel sheet.

The embodiments of the wall panel 3 and the roof panel 5 are formed so that the structural elements 13 contact the rear surfaces 11 of the façade 7 over a substantial area of the façade 7. By way of example, the substantial area of the façade 7 may be at least 75%, typically 80%, typically at least 85%, and more typically at least 90%, of the total façade area.

The structural elements 13 of the embodiments of the wall panel 3 and the roof panel 5 make it possible to provide the panels 3, 5 with sufficient structural rigidity to resist warping, twisting, buckling and other forms of distortion of the panels that detract from the appearance of the front surfaces 9 of the façades 7 of the panels 3, 5. In other words, the structural elements 13 structurally support the façades 7 so that the front surfaces 9 present a required appearance without any distortion of the front surfaces 9. The structural elements 13 also facilitate mounting the panels 3, 5 to the structural framework. More specifically, it is possible to confine the functionality to mount the panels 3, 5 to the structural framework to the structural elements 13 and not to the façades 7 of the panels 3, 5. As a consequence, the exterior appearance of the panels 3, 5 need not be compromised by fasteners extending through the façades that are visible to persons looking at the panels 3, 5.

In the embodiments of the wall panel 3 shown in the Figures, the structural element 13 is arranged with the ribs 15 and the troughs 17 extending horizontally. In the embodiments of the roof panel 5 shown in the Figures, the structural element 13 is arranged with the ribs 15 and the troughs 17 extending upwardly between the ridge board (not shown) and the gutter 29. The invention is not confined to these orientations of the ribs 15 and the troughs 17 in the panels 3, 5.

The embodiments of the wall panel system shown in the Figures includes a plurality of the embodiments of the wall panels 3 mounted to the support structure of posts 21 and rails 23 with small gaps between the sides of the façades 7 of adjacent panels 3, with the wall panels 3 arranged in horizontally-extending rows and vertically-extending columns. In use, the lowermost row of wall panels 3 is positioned first, with successive wall panels 3 in the row being positioned moving along the row form one end. Wall panels 3 in each successive row are then positioned, as described below.

As described above, the façade 7 of the embodiments of the wall panel 3 and the roof panel 5 shown in the Figures is formed from steel sheet, typically thin gauge sheet, and is quadrilateral with a pair of opposed parallel sides and parallel top and bottom (as viewed in the Figures) and presents the flat front surface 9 in the embodiments shown in the Figures.

By way of example, the parallel top and bottom of the façade 7 of the embodiment of the wall panel 3 as viewed in the Figures:
 (a) are formed to contribute to locating the façade 7 and the structural element 13 together;
 (b) include complementary formations that allow the above-described overlapping relationship with an adjacent wall panel 3; and
 (c) are formed to contribute to locating the wall panel 3 in relation to the structural framework.

More particularly, the parallel top and bottom of the façade 7 of the embodiment of the wall panel 3 as viewed in FIGS. 1-5 include an extension, in the form of a lip 41, of the front surface 9 of the façade that can be connected, such as by being fastened, to the structural framework and then covered by an adjacent panel when, in use, the adjacent panel is positioned in overlapping relationship.

With reference to FIG. 2, the bottom of the façade 7 of the embodiment of the wall panel 3 includes a rearwardly extending flange 35 and an upturned lip 37 that define an upwardly-opening channel that receives and locates lower sections of the structural element 13. In use, when forming the lowermost row of wall panels 3 in a wall panel assembly, this channel sits snuggly in the upwardly opening channel member 31 (see FIG. 8) of the structural framework and overlaps with the top of the façade 7—see the next paragraph—of an adjacent wall panel 3.

Figure 5:
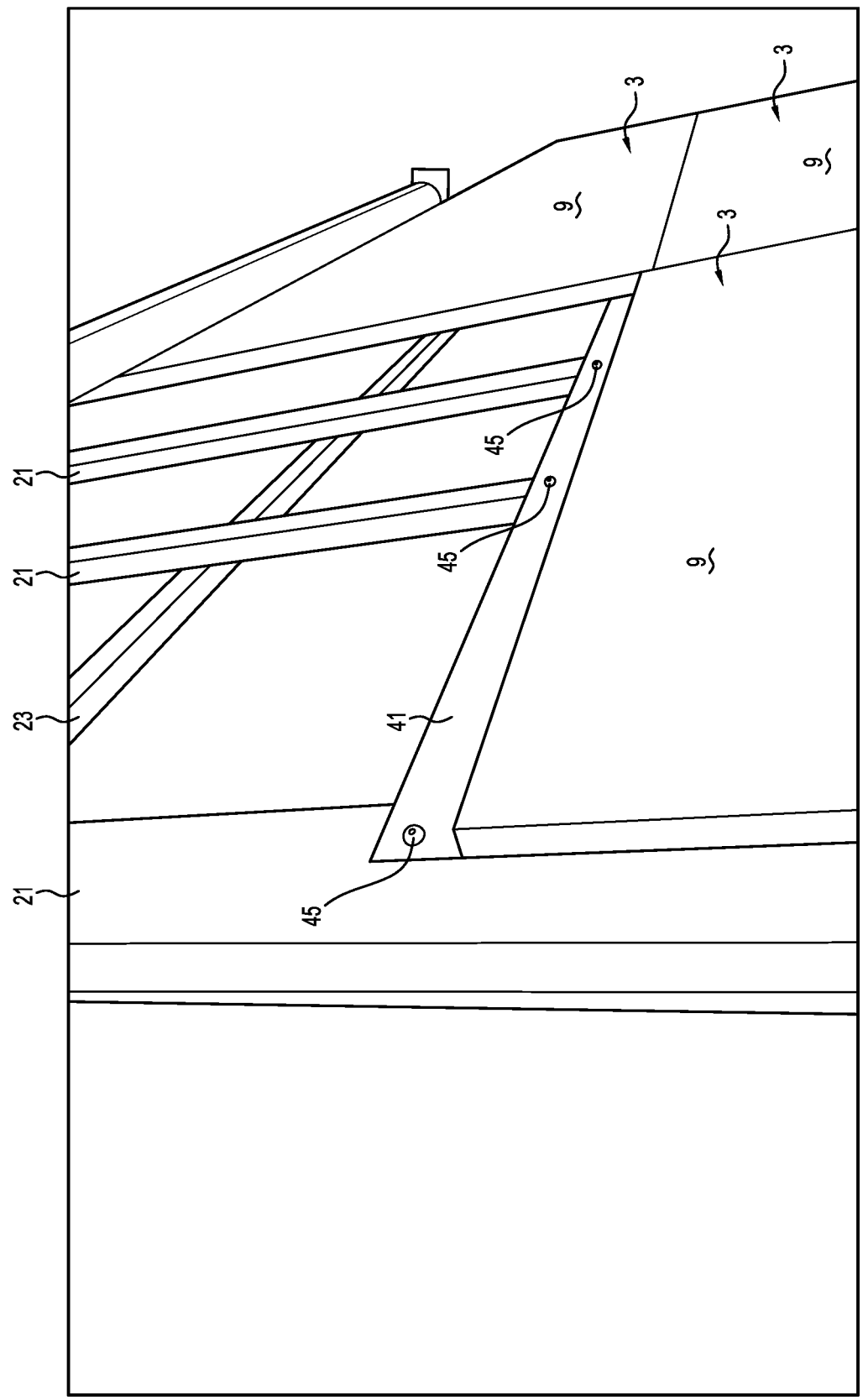
FIG. 5 is a perspective view of a section of an embodiment of a wall panel system made from a plurality of the wall panel shown in FIGS. 1 and 2.
Figure 6:
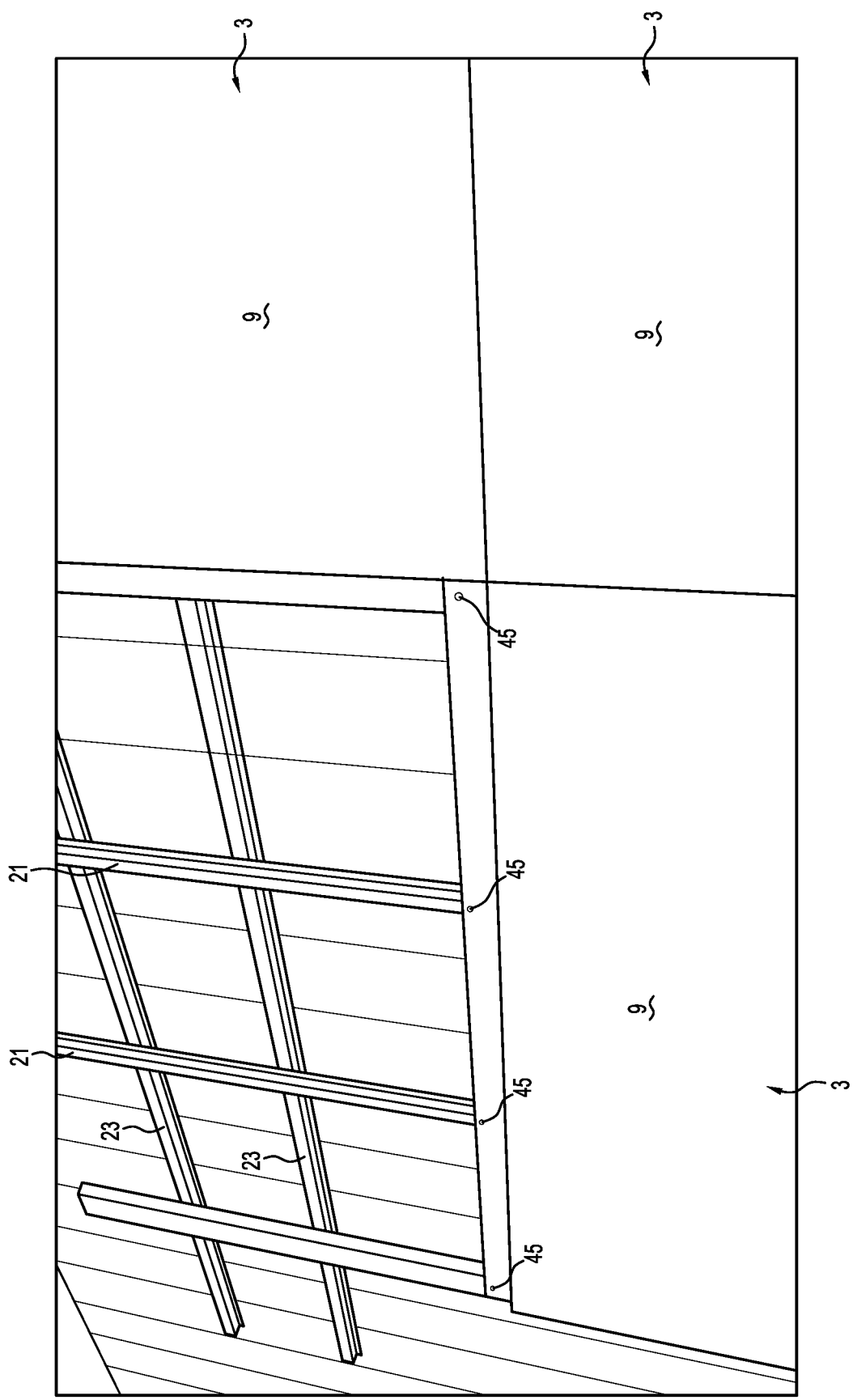
FIG. 6 is a perspective view of the section of the embodiment of the wall panel system from a different direction to that of FIG. 5.
Figure 7:
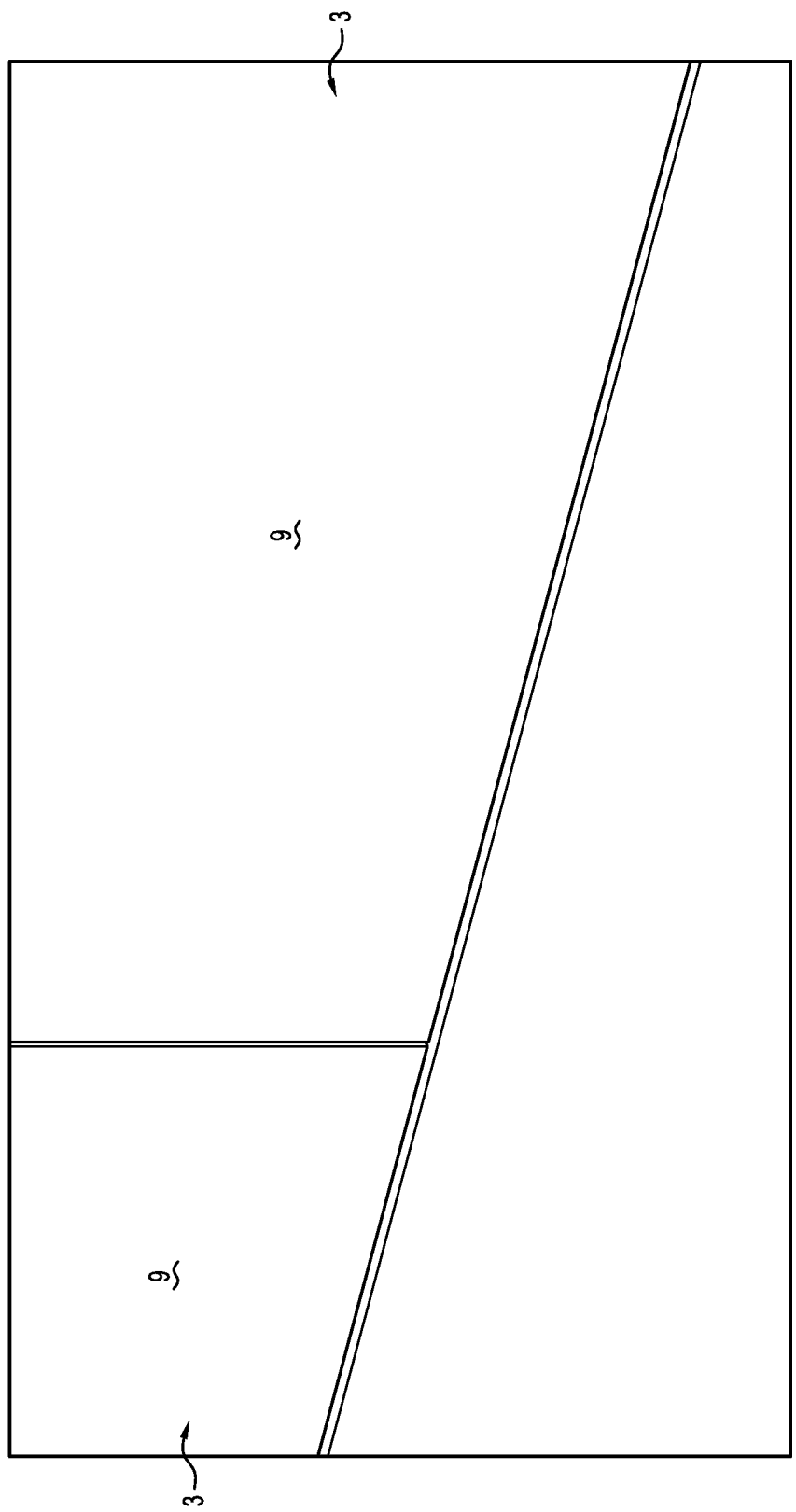
FIG. 7 is a perspective view of a lower section of the wall panel system shown in FIG. 6.
Figure 8:
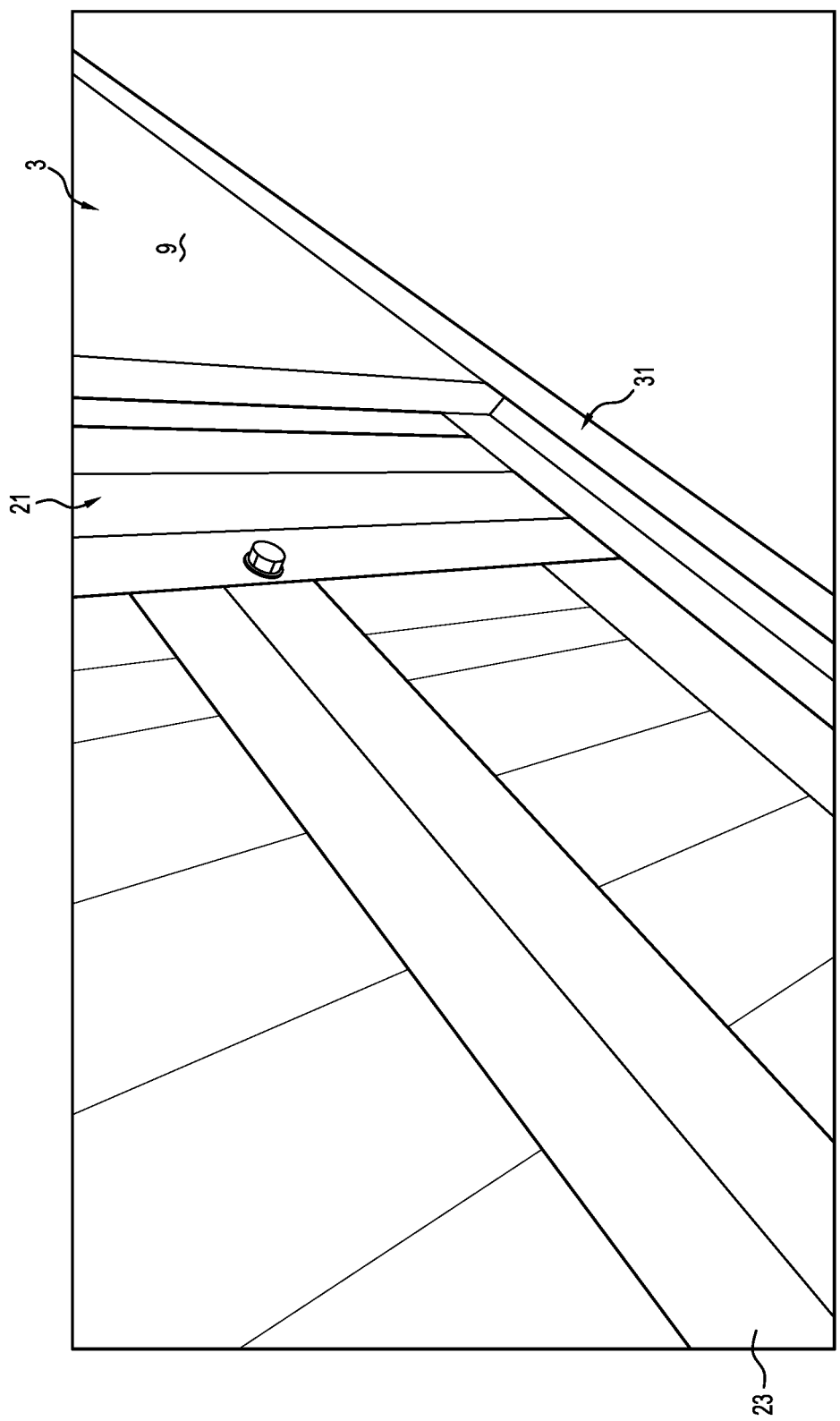
FIG. 8 is a perspective view that illustrates the construction of a lower section of the wall panel system shown in FIG. 6.
Figure 9:
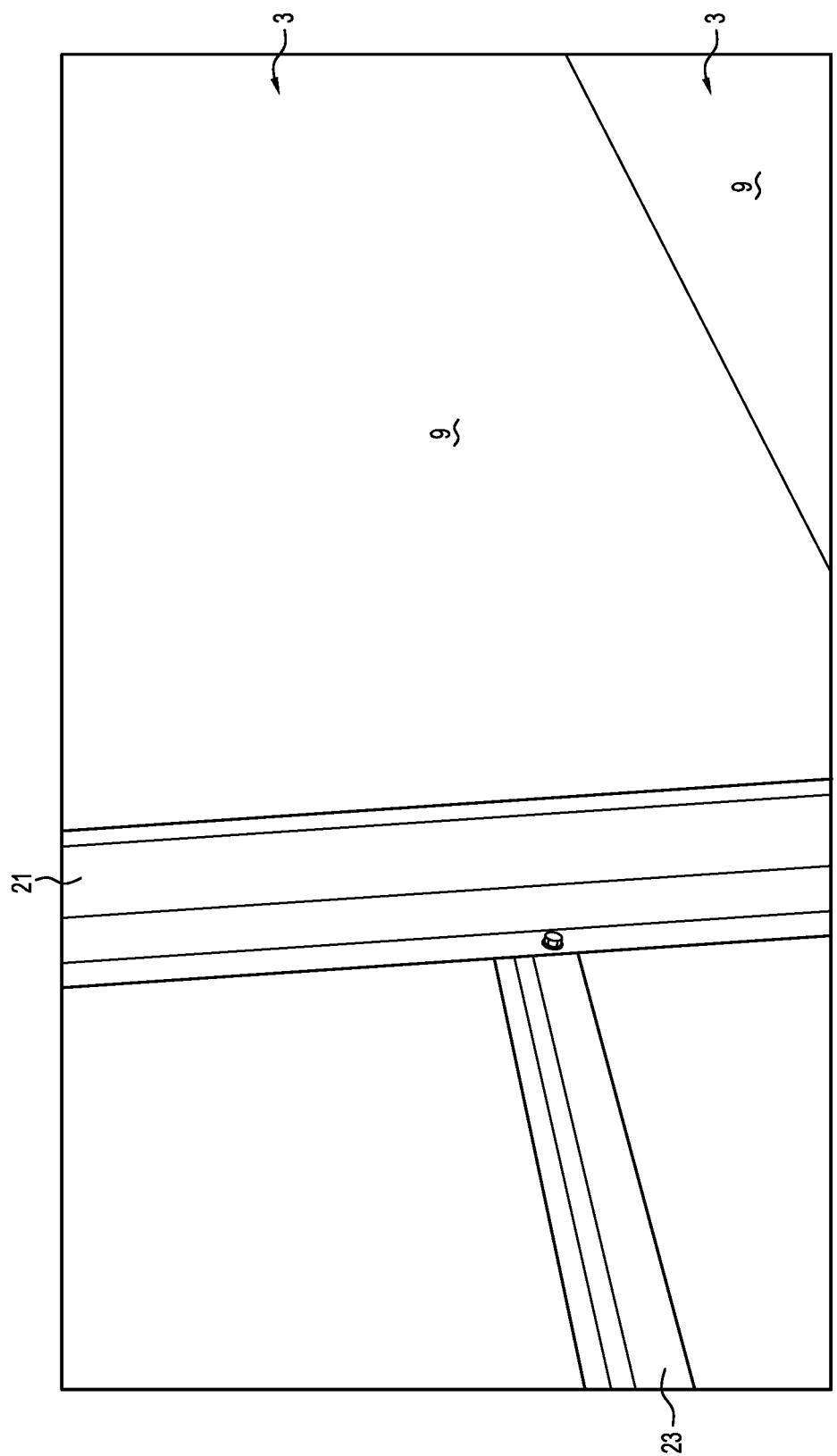
FIG. 9 is a perspective view that illustrates how a wall panel is connected to a post in the wall panel system shown in FIG. 3.

With reference to FIGS. 1, 5, and 6, the top of the façade 7 of the embodiment of the wall panel 3 includes a rearwardly extending flange 39 (only visible in FIG. 1), which could be described as a shoulder, and an outwardly extending lip 41 that is parallel to the front face 9 of the façade 7. The flange 39 contributes to locating and fastening the façade 7 and the structural element 13 together. The lip 41 is provided to facilitate locating the wall panel 3 in relation to the structural framework and to provide an overlapping relationship with an adjacent wall panel 3 in the next row of panels. More particularly, the lip 41 includes a plurality of spaced-apart openings 43 that, in use, receive fasteners 45 that secure the façade 7 and therefore the wall panel 3 to the structural framework and, at the same time provide mounting locations for a lower section of the panel 3, i.e. the bottom of the façade 7 of the wall panel 3 in the next row of panels, as described below.

The openings 47 in the structural element 13 of the embodiment of the wall panel 3 and the roof panel 5 shown in FIGS. 1-5 are formed as key-hole openings 47, with the narrower stems of the openings 47 extending upwardly from the wider circular parts of the openings 47.

With this key-hole opening arrangement, in use, a new wall panel 3 in the next row of wall panels 3 is positioned so that the circular parts of the key-hole openings 47 receive the already-positioned fasteners 45 and the new panel 3 is slid downwardly so that the fasteners 45 extend through the stems of the openings 47. In this position, the lower section of the new panel 3 overlaps the lip 41 of the lower wall panel 3 and is retained in position in this overlapping relationship by the fasteners 45 and the key-hole openings 47. These steps are repeated to position successive wall panels 3 to form the wall panel assembly.

The embodiment of the roof panel system shown in FIGS. 10-12 includes a plurality of the above-described roof panels 5 mounted to the support structure of the rafters 27 and the battens 31.

The roof panels 5 are arranged in successive rows of panels 5, with the lowermost row being positioned first in relation to the gutter 29, and then the roof panels 5 in successive rows being positioned in overlapping relationship moving from one end of a row to the other end to form a saw-tooth profile when viewed from a side and with adjacent roof panels 5 in each row being in side-by-side relationship separated by gaps and defining a flat surface separated by the gaps.

The key-hole openings 47 in the exposed sections of the structural element 13 of each roof panel 5 makes it possible to secure each successive roof panel 5 in a row simply and easily. The roof panels 5 in a successive row are positioned in overlapping relationship with the already-positioned roof panels 5 in a lower row by positioning each new roof panel 5 in turn so that the fasteners 45 extend through the circular parts of the key-hole openings 47 and then sliding the new roof panel 5 downwardly so that the stems of the key-hole openings 47 receive the fasteners 45.

With reference to FIGS. 13-22, the other embodiment of the roof panel 5 shown in these Figures includes the same key components of the façade 7 and the structural element 13 described in relation to the other embodiment of the roof panel 5 and the embodiment of the wall panel 3 shown in FIGS. 1-12.

Specifically, with reference to FIGS. 13-22, the façade 7 is a non-structural element, intended to present a flat front surface in this embodiment.

Figure 14:
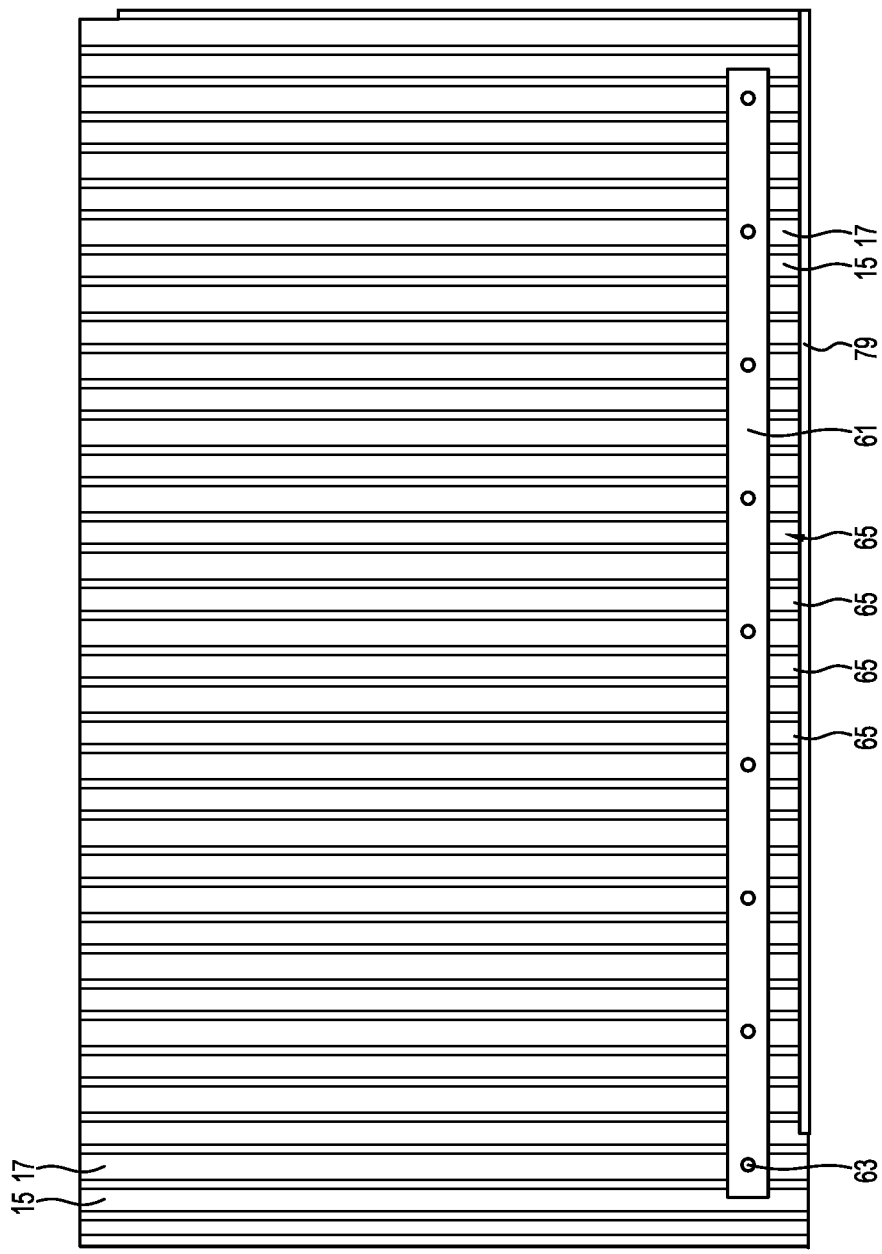
FIG. 14 is a rear view of the embodiment of the roof panel shown in FIG. 13.
Figure 17:
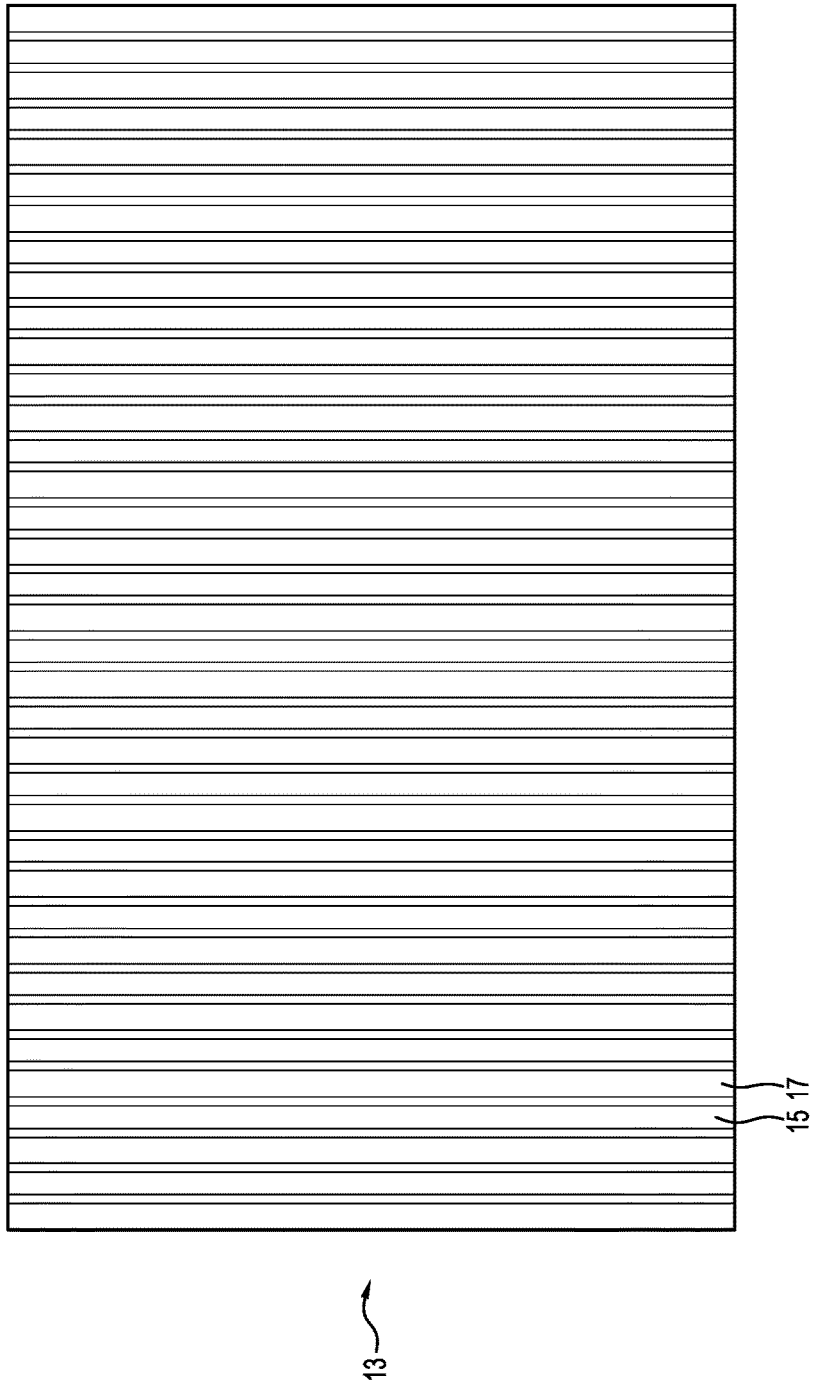
FIG. 17 is a front view of a structural element of the roof panel shown in FIG. 13.
Figure 18:
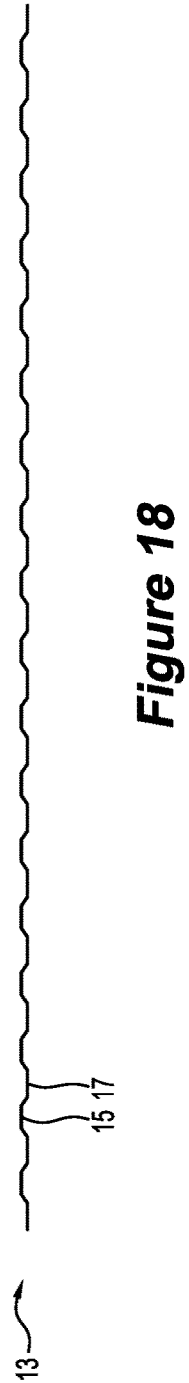
FIG. 18 is a side view of the structural element of the roof panel shown in FIG. 13.

With reference to FIGS. 14-16, the façade 7 also includes a lip 79 that facilitates locating the roof panel 5 of this embodiment in relation to another roof panel 5 in a successive row of panels.

In addition, with reference to FIGS. 13-22, the structural element 13 is a profiled steel sheet having parallel elongate ribs 15 and parallel elongate troughs 17 positioned with the ribs 15 contacting and adhered to the rear surface 19 of the façade 7.

Figure 22:
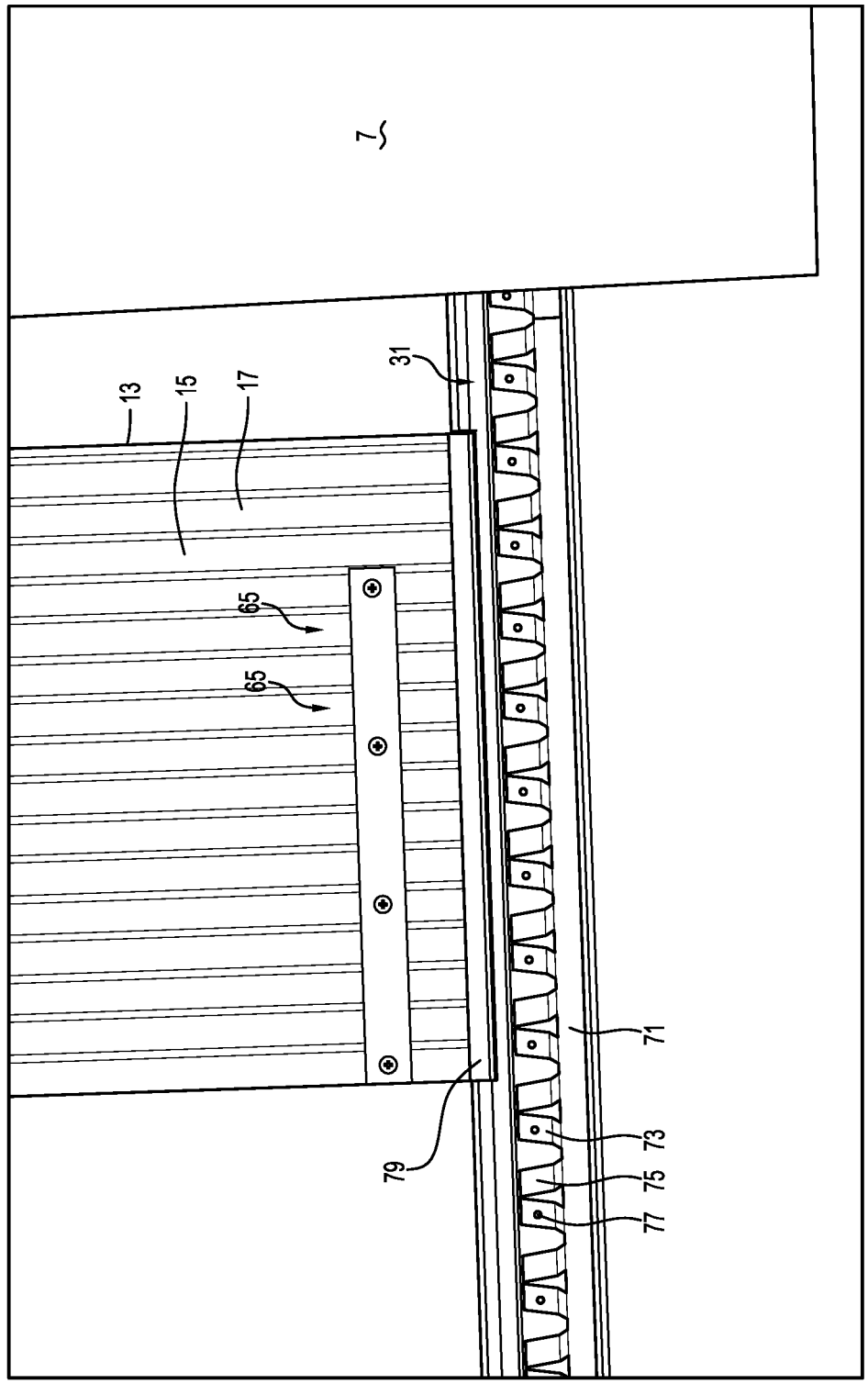
FIG. 22 is a perspective view that illustrates a retainer element of the type shown in FIG. 20 fastened to a batten of a roof structural framework and a roof panel of the type shown in FIGS. 13-21 positioned with the lower surface facing upward.
Figure 23:
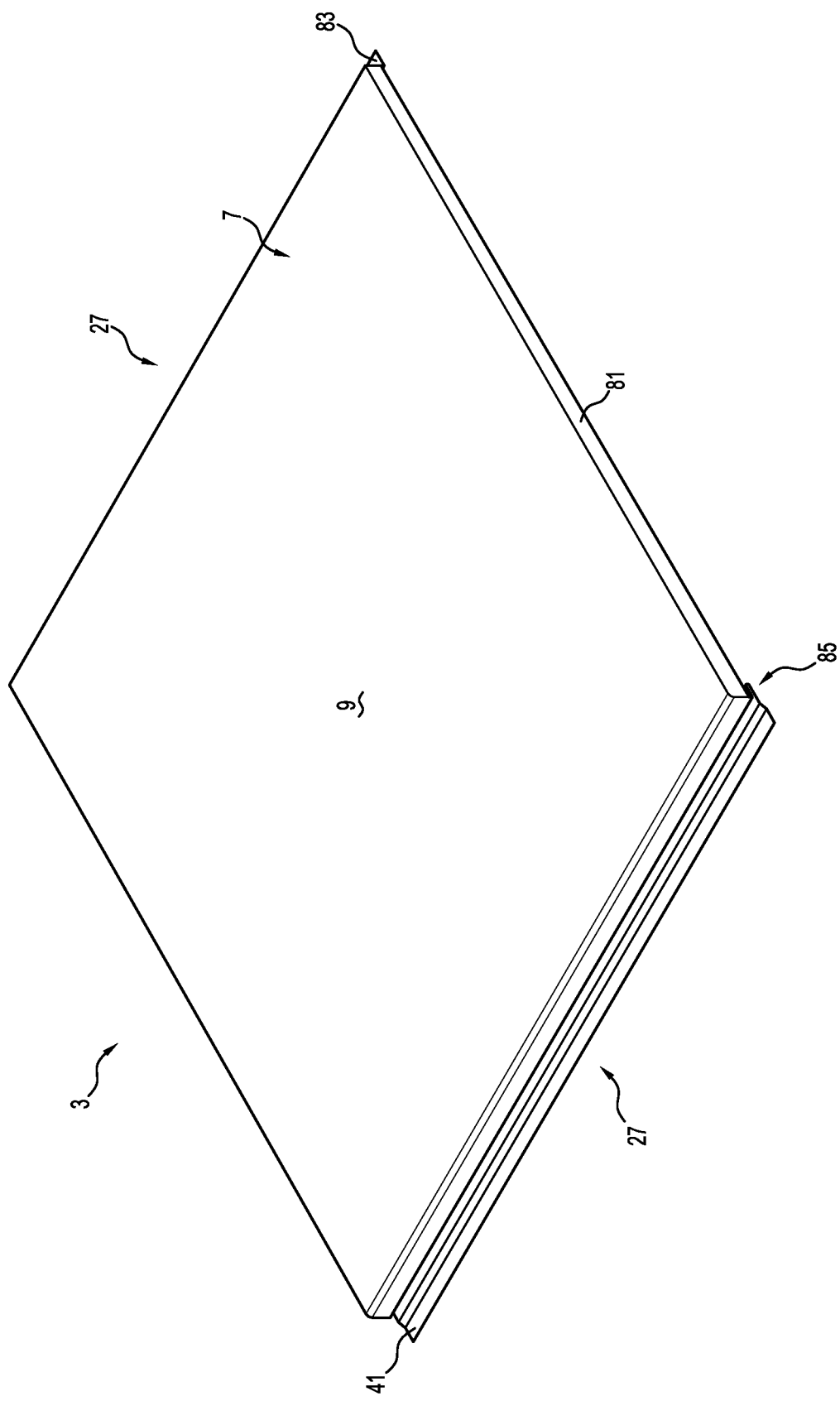
FIG. 23 is perspective view of another embodiment of a wall panel in accordance with the invention.
Figure 24:
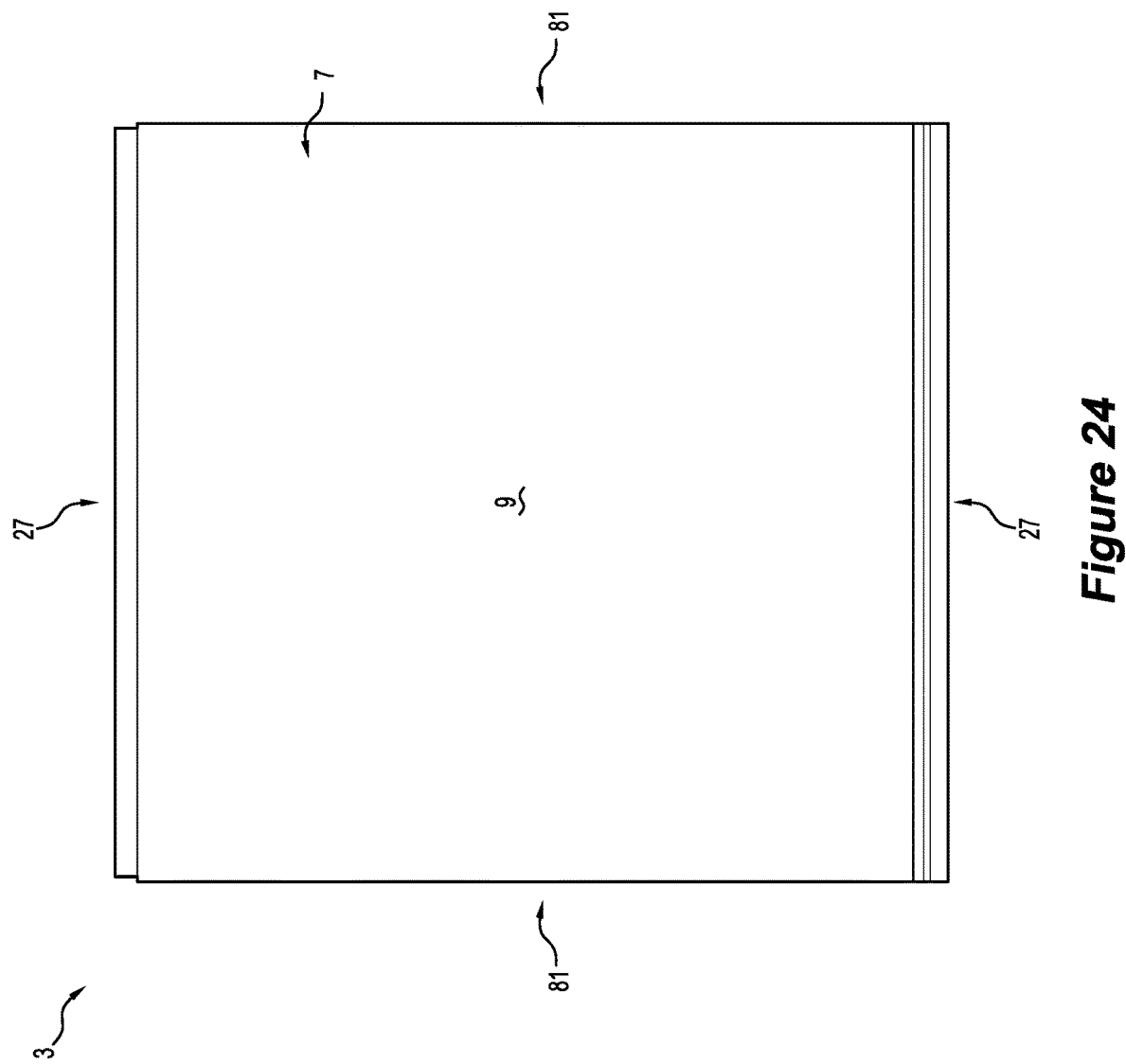
FIG. 24 is a top plan view of the wall panel shown in FIG. 23.
Figure 25:
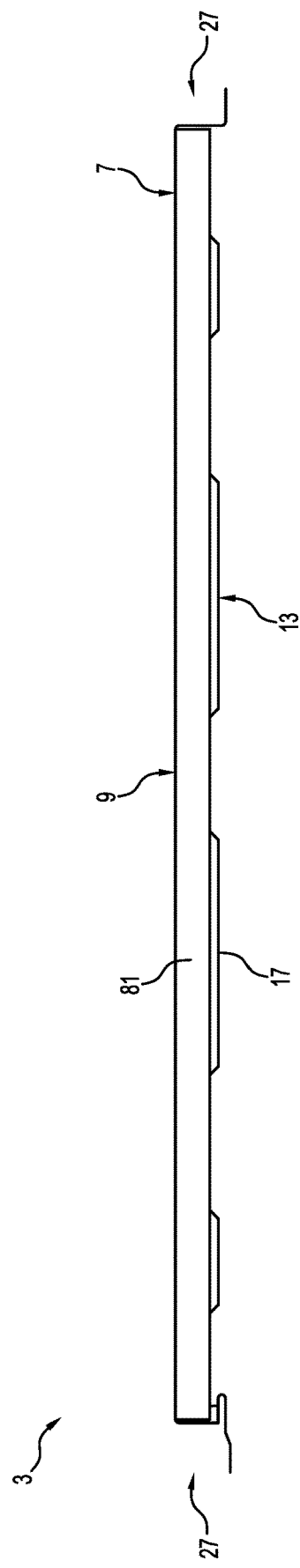
FIG. 25 is a side view of the wall panel shown in FIG. 23.
Figure 26:
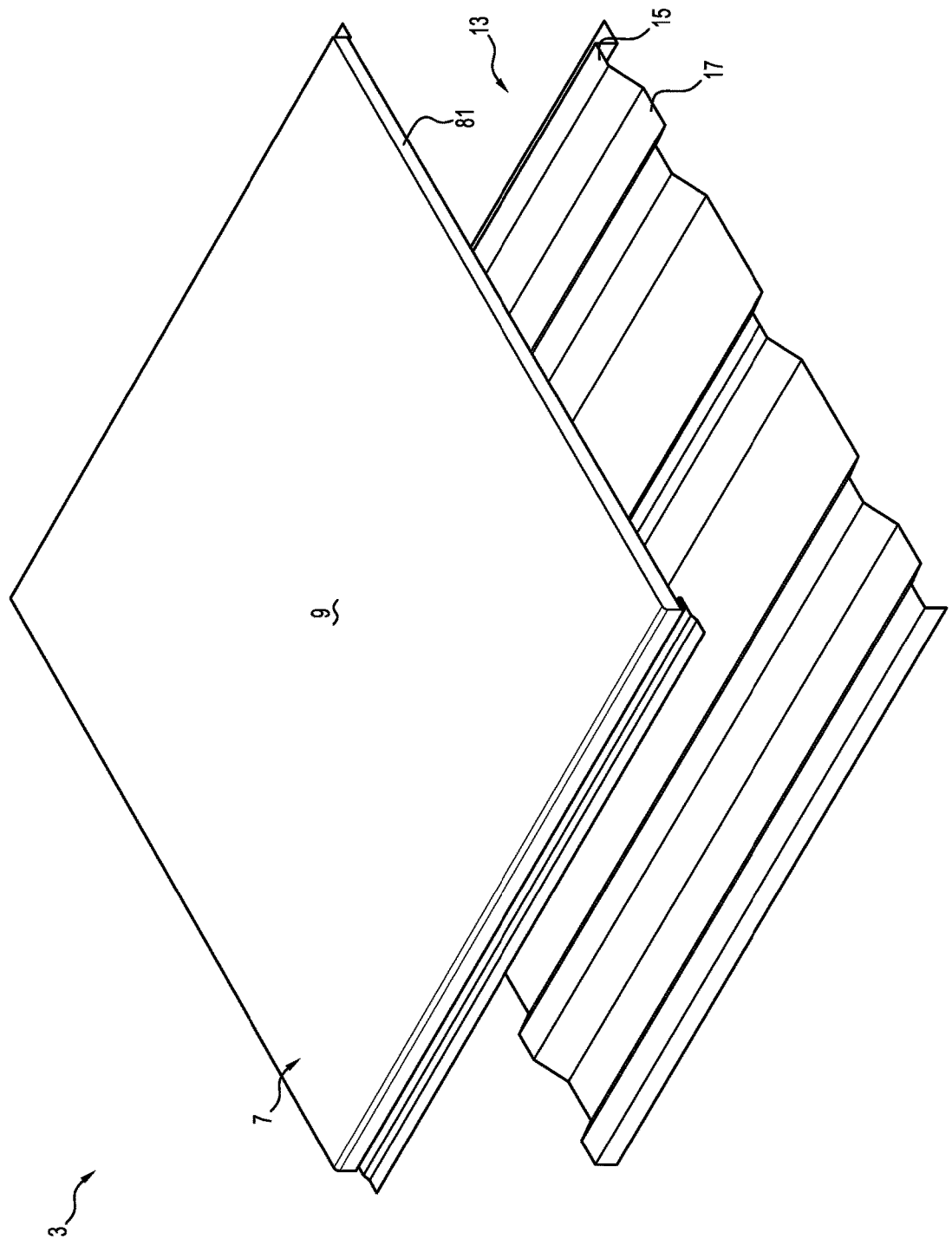
FIG. 26 is a perspective exploded view of the wall panel shown in FIG. 23.

The embodiment of the roof panel 5 shown in FIGS. 13-22 also includes an elongate retainer plate 61 that is connected by rivets 63 or any other suitable means to troughs 17 of the structural element 13 on the bottom surface of the structural element 13—see FIGS. 14 and 22. The retainer plate 61 and the structural element 13 define a plurality of spaced-apart slots 65 (see FIG. 14).

Figure 13:
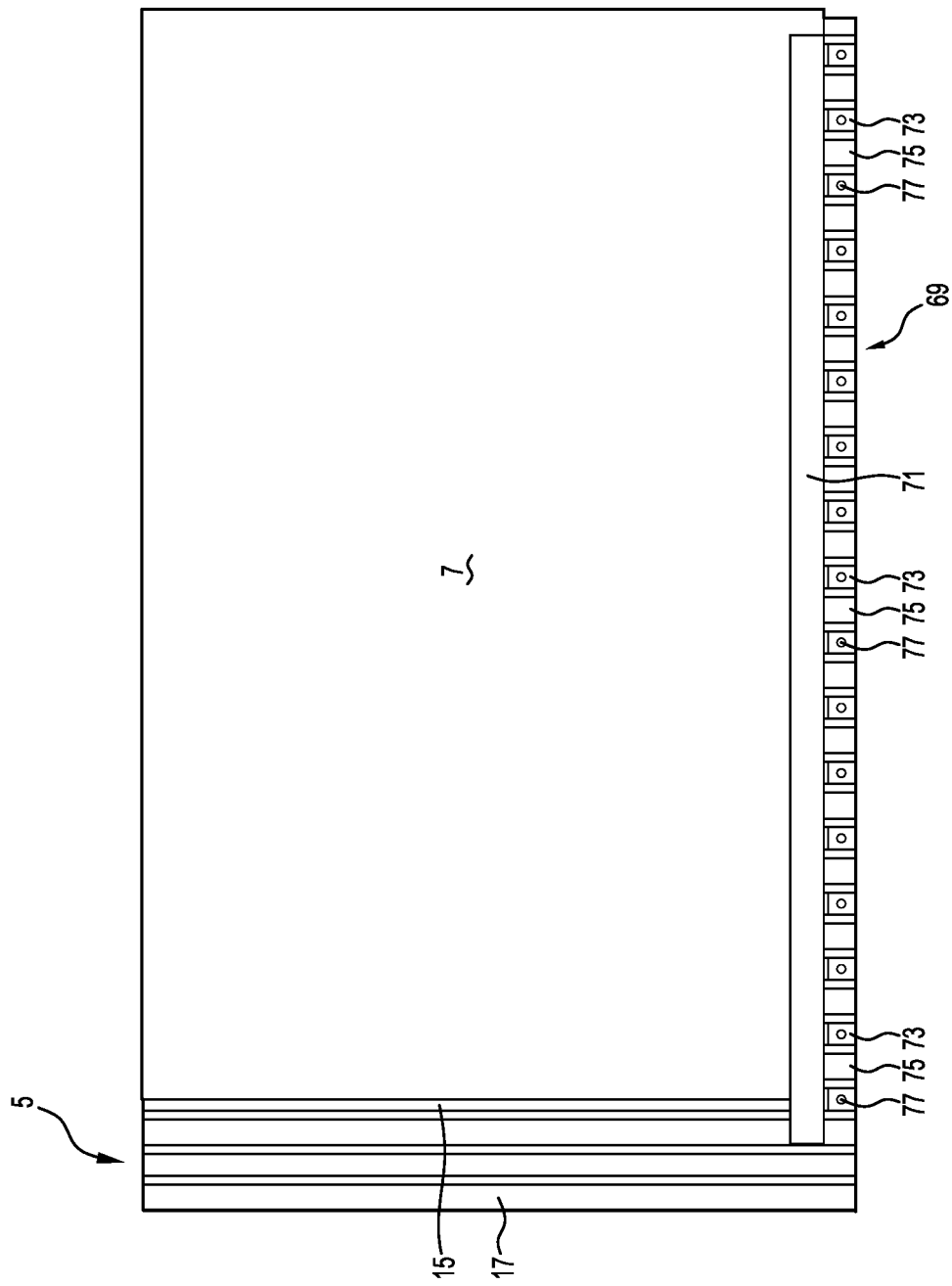
FIG. 13 is a front view of another embodiment of a roof panel in accordance with the invention.

The embodiment of the roof panel 5 shown in FIGS. 13-22 also includes an elongate retainer element 69 (which may also be described as a "ladder" clip) that is connected to the front surface of the façade 7 on the front surface of the roof panel 5—see FIG. 13. The retainer element 69 may also be used as a separate element—see FIG. 22. The retainer element 69 includes an elongate strap 71 and a series of tabs 73, 75 that extend from one side of the strap 71. A first series of tabs 73 includes openings 77 to facilitate fastening the tabs 73 to roof structural framework, e.g. battens 31. A second series of tabs 75 are provided to extend into the spaced-apart slots 65 of the retainer plate 61 of a roof panel 5 in a successive row that, in use in the construction of a roof, is formed and thereby locate the two panels 5 together. The tabs 73, 75 alternate along the length of the strap 71.

In use, in the construction of a roof, a plurality of the embodiment of the roof panel 5 shown in FIGS. 13-22 is positioned in side-by-side overlapping relationship on the gutter line of a roof frame to form a first row of the roof panels 5—as described above in relation to the other embodiment of the roof panel 5.

In this regard, with reference to FIG. 22, a plurality of the retainer elements 69 are first fastened to a roof batten 31 on the gutter line of the roof frame, with the tabs 75 directed up the roof line to receive the roof panels 5 in the first row of roof panels 5.

With further reference to FIG. 22, it can be appreciated that the roof panel 5 as shown in the Figure, i.e. with the structural element 13 facing upwardly in the Figure (and shown in this orientation for the purpose of explaining the embodiment), can be turned over so that the retainer plate 61 is facing downwardly and can be manoeuvred down the roof line so that the slots 65 defined by the retainer plate 61 and the ribs 15 receive and retain the tabs 75 of the retainer elements 69.

When in this position, the upper end of the embodiment of the roof panel 5 in the first row overlies the next batten 31 in the roof frame and fasteners can be positioned through the openings 77 in the tabs 73 of the retainer elements 69 at this end of the roof panels 5 to connect the roof panels 5 to the batten 31.

A plurality of the embodiment of the roof panel 5 shown in FIGS. 13-22 is then placed in successive rows in overlapping relationship with the roof panels 5 in the first row, moving from one end of a row to the other end to form a saw-tooth profile when viewed from a side and with adjacent roof panels 5 in each row being in side-by-side relationship.

More particularly, a plurality of the embodiment of the roof panel 5 shown in FIGS. 13-22 is positioned in the successive rows with the tabs 75 facing up the roof-line and the tabs 73 fastened to battens 31 of the roof frame. Each embodiment of the roof panel 5 shown in FIGS. 13-22 that is in the next row is positioned so that the slots 65 defined by the retainer plate 61 and the structural element 13 receive the upwardly-facing tabs 75 of roof panels 5 of the lower row, with the tabs 75 being retained in the slots 65.

The embodiment of the roof panel 5 shown in FIGS. 13-22 is configured so that, when in this position, the roof panels 5 of the successive row extends over the upper section of the retainer element 69 of the roof panels 5 of the lower row, with the lip 79 of the façade 7 of each roof panel 5 of the successive row extending over and engaging the strap 71 of one of the lower roof panels 5 and forming a lower edge of the successive roof panel 5.

It can readily be appreciated that the above combination of the retainer plate 61 and the retainer element 69 aligns, indexes and fixes placement of the roof panels 5 together and on the roof framework.

FIGS. 23-29 show three other embodiments of the wall panel 3 in addition to the embodiment shown in FIGS. 1-9.

With reference to FIGS. 23-29, these other embodiments of the wall panel 3 includes the same key components of the façade 7 and the structural element 13 described in relation to the other embodiment of the wall panel 3 shown in FIGS. 1-9 and the embodiments of the roof panel 5 shown in FIGS. 10-12 and FIGS. 13-22.

Specifically, with reference to FIGS. 23-29, the façade 7 is a non-structural element, intended to present a flat front surface in this embodiment.

In addition, with reference to FIGS. 23-29, the structural element 13 is a profiled steel sheet having parallel elongate ribs 15 and parallel elongate troughs 17 positioned with the ribs 15 contacting and connected to the rear surface 19 of the façade 7. In these embodiments, the steel sheet has a trapezoidal profile. It is noted that the profile may be any suitable profile.

In addition, with reference to FIGS. 23-29, the structural element 13 includes the extension, in the form of the lip 41, of the upper section of the front surface 9 of the façade 7 (which is the left side in the Figures) that can be connected, such as by being fastened, to an underlying structural framework and then covered by an adjacent wall panel 3 when, in use, the adjacent wall panel 3 is positioned in overlapping relationship.

There are differences between the embodiment of the wall panel 3 of FIGS. 1-9 and the embodiments of the wall panel 3 of FIGS. 22-29.

With reference to FIGS. 23-29, the embodiments of the wall panels 3 have closed rather than open sides—see the numeral 81 in FIGS. 23-26.

In addition, the embodiments of the wall panel 3 of FIGS. 22-29 have different structures at the upper section and the lower section of the wall panels 3 to the embodiment of FIGS. 1-9. Specifically, the upper section and the lower section of the wall panels have complementary male formations 83 and female formations 85 that allow adjacent wall panels 3 to be connected together.

The façade 7 and the structural element 13 of each of the embodiments of the wall panel 3 of FIGS. 22-29 are mechanically connected together. As noted above, this is an important functional feature, for example in the case of a fire which may cause adhesive to fail. The mechanical connection will keep the façade 7 and the structural element 13 in each embodiment together and maintain the integrity of the wall panel 3.

As can best be seen in FIGS. 27-29, each embodiment of the wall panel 3 is formed with the façade 7 and the structural element 13 mechanically connected together via a mechanical interlock, namely a friction fit, between the façade 7 and the structural element 13 at upper and lower sections (the left side and the right side respectively of the embodiments as viewed in FIGS. 27-29). The friction fit is provided by the flanges 39 of the façade 7 (described in relation to the embodiment of FIGS. 1-9) and flanges 87 of the structural elements 13.

The embodiment of the wall panel 3 shown in FIG. 28 also includes a further mechanical interlock in the form of a section of the structural element 13 that is folded over a section of the façade 7 and the structural element 13 at a lower end of the wall panel 5 (the right side of the embodiment as viewed in FIG. 28). This fold-over section is shown by the three fold steps in the Figure.

It can readily be appreciated from the above description that the embodiments of the wall panel 3 and the roof panel 5 make it possible to assemble wall and roof panel assemblies as shown in the Figures quickly and easily.

Many modifications may be made to the embodiments of the invention described herein without departing from the spirit and scope of the invention.

By way of example, whilst the embodiments of the panel 3 shown in FIGS. 1-9 and FIGS. 22-29 are described as a wall panel, it can readily be appreciated that the panel 3 could also be used as a roof panel.

By way of further example, whilst the panel 5 shown in FIGS. 10-12 and FIGS. 13-22 are described as a roof panel, it can readily be appreciated that the panel 5 could also be used as a wall panel.

By way of further example, whilst the embodiments are described as wall panels 3 and roof panels 5, the invention extends to embodiments in which the described wall panels 3 are used are roof panels and the roof panels 5 are used as wall panels 3. By way of example, the combination of the elongate retainer plate 61 and the elongate retainer element 69 (i.e. the "ladder" clip) may be used in wall panels 3 to form continuous front surfaces.

The invention claimed is:

1. A panel for a wall that is adapted to be mounted to a structural framework of the wall, the panel comprising at least two components that are connected together, with the at least two components comprising:
   (a) a façade comprising a metal sheet that has (i) an outer surface that defines a front surface of the panel and (ii) a rear surface that extends over an opposite face of the metal sheet defining the front surface; and
   (b) a structural element connected to and supporting the façade, the structural element comprising a profiled metal sheet having parallel ribs and parallel troughs positioned with the ribs or the troughs contacting and connected to the rear surface of the façade, the structural element being completely behind the façade when viewed from the front;
   wherein a first pair of parallel sides of the façade are formed for locating and mounting the panel in relation to the structural framework and include complementary formations configured for overlapping relationship with an adjacent said panel located and mounted in relation to the structural framework.

2. The panel of claim 1, wherein the metal sheet comprises steel sheet or aluminium sheet, and wherein the façade and the structural element are connected together with an adhesive.

3. The panel of claim 1, wherein the façade and the structural element are connected together mechanically via a mechanical interlock between the façade and the structural element, wherein the mechanical interlock is a friction fit of the structural element and the façade or results from a section of the structural element being folded over a section of the façade.

4. The panel of claim 1, being formed so that in use mounted to the structural framework of the wall, the panel and the adjacent said panel are configured to be arranged in an overlapping relationship with the front surface of the façade of the panel and a front surface of a façade of the adjacent said panel forming a continuous front surface on the wall.

5. The panel of claim 4, wherein the overlapping relationship is a side-by-side overlapping relationship an end-to-end overlapping relationship with the front surface of the façade of the panel and the front surface of the façade of the adjacent said panel forming a continuous front surface on the wall.

6. The panel of claim 1, further including an alignment and fastening system for facilitating alignment of the panel in relation to the adjacent said panel and the structural framework and configured for fastening the panel to the structural framework, wherein the alignment and fastening system is a concealed system in that the system is not visible when a person views the panel after it is positioned and mounted on the wall.

7. The panel of claim 1, wherein the front surface of the façade is a flat surface, and wherein the façade is quadrilateral with a second pair of parallel sides in addition to the first pair of parallel sides.

8. The panel of claim 1, wherein the façade is quadrilateral with a second pair of parallel sides in addition to the first pair of parallel sides.

9. The panel of claim 1, wherein the façade is quadrilateral with a second pair of parallel sides in addition to the first pair of parallel sides, and wherein one side of the first pair of parallel sides includes an extension of the front surface of the façade that can be fastened to the structural framework and then covered by the adjacent said panel when, in use, the adjacent said panel is positioned in the overlapping relationship.

10. A wall constructed from a plurality of panels of claim 1 connected to a structural framework.

11. The panel of claim 1, wherein one side of the first pair of parallel sides of the façade includes an extension of the front surface of the façade to be fastened to the structural framework and then covered by the adjacent said panel when, in use, the adjacent said panel is positioned in overlapping relationship.

12. The panel of claim 1, wherein one side of the first pair of parallel sides of the facade includes a flange extending rearwardly from the front surface of the façade and a lip extending outwardly from the flange parallel to the front surface of the façade.

13. The panel defined in claim 12, wherein the lip includes a plurality of openings to receive fasteners to mount the panel to the structural framework.

14. The panel defined in claim 12, wherein the other side of the first pair of parallel sides of the façade includes a flange extending rearwardly from the front surface of the façade and an upturned lip, which together with the front surface of the façade, define a channel for receiving or locating the structural element behind the façade.

15. The panel defined in claim 14, wherein the structural element extends between the flanges of the first pair of parallel sides.

16. The panel defined in claim 14, wherein the flanges of the one side and the other side of the first pair of parallel sides define upper and lower side edges of the panel on the wall.

17. The panel defined in claim 14, wherein the flanges of the one side and the other side of the first pair of parallel sides define lateral side edges of the panel on the wall.

18. The panel defined in claim 1, wherein the complementary formations of the first pair of parallel sides of the façade comprise male and female formations configured for overlapping relationship with the adjacent said panel.

19. The panel defined in claim 1, wherein each side of a second pair of parallel sides of the façade includes a rearwardly extending flange, wherein the flanges define opposite side edges of the panel for the wall.

20. The panel defined in claim 1, wherein each side of a second pair of parallel sides is open and the panel includes a separate elongate edge element located to close each open side of the second pair of parallel sides.

21. The panel defined in claim 20, wherein the elongate edge element is an L-shaped elongate edge element to be located so that one web of the L-shaped elongate edge element contacts a rear surface of the panel and an-other web of the L-shaped elongate edge element closes the open side of the second pair of parallel sides.

22. The panel defined in claim 20, wherein the elongate edge element is adapted to close one side of the second pair of parallel sides of the adjacent said panel.

23. The panel defined in claim 22, wherein the elongate edge element is formed to define an elongate gap between the panel and the adjacent said panel.

24. The panel defined in claim 22, wherein the elongate edge element includes a backing plate and two spaced-apart parallel webs extending from the backing plate, with a section of the backing plate and one of the two spaced-apart parallel webs defining an L-shaped element, and with another section of the backing plate and the other of the two spaced-apart parallel webs defining an L-shaped element.

25. A panel adapted to be mounted to a structural framework of a wall, the panel including at least two components that are connected together, with the components comprising:
(a) a façade comprising a steel sheet material that has (i) an outer surface that defines a front surface of the panel and (ii) a rear surface, and
(b) a structural element connected to and supporting the façade, the structural element comprising a profiled steel sheet having parallel ribs and parallel troughs positioned with the ribs or the troughs contacting and connected to the rear surface of the façade, the structural element being completely behind the façade when viewed from the front; and
wherein one side of a first pair of parallel sides of the façade includes an extension of the front surface of the façade substantially parallel to the front surface, which extension is adapted to be fastened to the structural framework and covered by an adjacent said panel positioned in overlapping relationship therewith in use.

26. A panel adapted to be mounted to a structural framework of a wall, the panel including at least two components that are connected together, with the components comprising:
(a) a façade comprising a steel sheet material that has (i) an outer surface that defines a front surface of the panel and (ii) a rear surface, and
(b) a structural element connected to and supporting the façade, the structural element comprising a profiled steel sheet having parallel ribs and parallel troughs positioned with the ribs or the troughs contacting and connected to the rear surface of the façade, the structural element being completely behind the façade when viewed from the front; and
wherein one side of a first pair of parallel sides of the façade includes a flange extending rearwardly from the front surface of the façade and a lip extending outwardly from the flange parallel to the front surface of the façade.

27. The panel defined in claim 26, wherein the other side of the first pair of parallel sides of the façade includes a flange extending rearwardly from the front surface of the façade and an upturned lip, wherein the front surface of the façade, the flange and the upturned lip define a channel for receiving or locating the structural element behind the façade.

28. The panel defined in claim 26, wherein the front surface of the façade is a flat surface, and wherein the façade is quadrilateral with a second pair of parallel sides in addition to the first pair of parallel sides.

29. The panel defined in claim 27, wherein the structural element extends between the rearwardly extending flanges of each of the one side and the other side of the first pair of parallel sides.

30. The panel defined in claim 27, wherein the rearwardly extending flanges of each of the one side and the other side of the first pair of parallel sides define upper and lower side edges of the panel on the wall.

31. The panel defined in claim 27, wherein the rearwardly extending flanges of each of the one side and the other side of the first pair of parallel sides define lateral side edges of the panel on the wall.

32. The panel defined in claim 26, wherein the first pair of parallel sides of the façade include complementary male and female formations configured for overlapping relationship with an adjacent said panel.

33. The panel defined in claim 26, wherein each side of a second pair of parallel sides of the façade includes a rearwardly extending flange, wherein these flanges of the second pair of parallel sides define opposite side edges of the panel.

\* \* \* \* \*